US012792057B2

(12) United States Patent
Trivedi et al.

(10) Patent No.: US 12,792,057 B2
(45) Date of Patent: Nov. 10, 2026

(54) OPTIMIZING ROBOT DEVICES USING FUSED 6-DEGREES-OF-FREEDOM CONTEXT

(71) Applicant: QUALCOMM Incorporated, San Diego, CA (US)

(72) Inventors: Nisarg Keyurbhai Trivedi, Santa Clara, CA (US); Diyan Teng, Sunnyvale, CA (US); Junsheng Han, Los Altos Hills, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 18/893,772

(22) Filed: Sep. 23, 2024

(65) Prior Publication Data

US 2026/0086569 A1 Mar. 26, 2026

(51) Int. Cl.

| | |
|---|---|
| ***A47L 11/40*** | (2006.01) |
| ***G05D 1/246*** | (2024.01) |
| ***G05D 1/646*** | (2024.01) |
| ***G05D 1/648*** | (2024.01) |
| *G05D 105/10* | (2024.01) |

(Continued)

(52) U.S. Cl.

CPC .......... *G05D 1/646* (2024.01); *A47L 11/4011* (2013.01); *G05D 1/246* (2024.01); *G05D 1/6486* (2024.01); *A47L 2201/04* (2013.01); *A47L 2201/06* (2013.01); *G05D 2105/10* (2024.01);

(Continued)

(58) Field of Classification Search

None

See application file for complete search history.

(56) References Cited

U.S. PATENT DOCUMENTS

| | | | | |
|---|---|---|---|---|
| 9,402,518 | B2 * | 8/2016 | Burlutskiy | A47L 11/4011 |
| 10,209,080 | B2 * | 2/2019 | Lindhé | A47L 11/4011 |

(Continued)

FOREIGN PATENT DOCUMENTS

| | | | |
|---|---|---|---|
| EP | 3508935 | B1 | 8/2022 |

OTHER PUBLICATIONS

Zhou Z., et al., "A LiDAR Mapping System for Robot Navigation in Dynamic Environments", IEEE Transactions on Intelligent Vehicles, Oct. 2023, pp. 1-20.

(Continued)

*Primary Examiner* — Abdhesh K Jha

(74) *Attorney, Agent, or Firm* — QUALCOMM Incorporated

(57) ABSTRACT

Techniques and systems are provided for image generation. For instance, a process can include obtaining remote sensing information from a user device, wherein the remote sensing information comprises at least one of 6-degrees-of-freedom (6DOF) trajectory information or presence information; obtaining an environment map from the robot device; reorienting the remote sensing information based on a determined offset and rotation for the remote sensing information; applying the offset and rotation to the remote sensing information to identify portions of the environment map that include detected objects; determining candidate areas for movement of the robot device based on the portions of the environment map that include the detected objects; and outputting the candidate areas for movement of the robot device for transmission to the robot device.

22 Claims, 11 Drawing Sheets

(51) Int. Cl.
*G05D 111/10* (2024.01)
*G05D 111/50* (2024.01)

(52) U.S. Cl.
CPC ...... *G05D 2111/10* (2024.01); *G05D 2111/52* (2024.01)

(56) References Cited

U.S. PATENT DOCUMENTS

| | | | |
|---|---|---|---|
| 10,291,765 | B2 | 5/2019 | So et al. |
| 11,119,496 | B1 | 9/2021 | Ebrahimi Afrouzi et al. |
| 11,321,914 | B1 | 5/2022 | Fotland et al. |
| 2019/0217476 | A1 | 7/2019 | Jiang et al. |
| 2019/0332114 | A1 | 10/2019 | Moroniti et al. |
| 2021/0011483 | A1 | 1/2021 | Li |
| 2021/0346543 | A1* | 11/2021 | Brooks ...................... A61L 2/24 |
| 2022/0080600 | A1* | 3/2022 | Kearns .................... G01S 17/93 |
| 2023/0401516 | A1* | 12/2023 | Chen ................ G06Q 10/06393 |

OTHER PUBLICATIONS

International Search Report and Written Opinion—PCT/US2025/043049—ISA/EPO—Dec. 2, 2025.

* cited by examiner

OPTIMIZING ROBOT DEVICES USING FUSED 6-DEGREES-OF-FREEDOM CONTEXT

FIELD

This application is related to robot devices. For example, aspects of the application relate to systems and techniques for optimizing robot devices using fused 6-degrees-of-freedom (6DoF) context.

BACKGROUND

Increasingly, robot devices or systems (e.g., robots which may perform cleaning, inspection, monitoring, mowing, etc.) are being used to perform various tasks within an environment (e.g., within a home, office, factory, etc.) that may also be occupied by people. Often the robot devices may include sensors to gather information about the environment. These sensors help the robot devices better navigate the environment, avoid objects and/or people, better perform certain tasks, and so forth.

However, sensors on the robot devices are limited to the perspective of the robot device. Further, the sensors of the robot device may not provide information regarding, for example, what may be happening in another room, in which case the robot device may not be able to take advantage of such information. For example, a robotic cleaner parked in a living room may not be able to sense that people had a dinner party in a kitchen and that the kitchen may now need deep cleaning. In some cases, it may be useful to leverage sensors from other devices to gather data that may be useful to robot devices in performing certain tasks.

SUMMARY

Systems and techniques are described herein for occlusion modeling based on images of an environment. The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for an apparatus for controlling a robot device is provided. The apparatus includes at least one memory comprising instructions; and at least one processor coupled to the at least one memory. The at least one processor is configured to: obtain remote sensing information from a user device, wherein the remote sensing information comprises at least one of 6-degrees-of-freedom (6DOF) trajectory information or presence information; obtain an environment map from the robot device; reorient the remote sensing information based on a determined offset and rotation for the remote sensing information; apply the offset and rotation to the remote sensing information to identify portions of the environment map that include detected objects; determine candidate areas for movement of the robot device based on the portions of the environment map that include the detected objects; and output the candidate areas for movement of the robot device for transmission to the robot device.

As another example, a method for controlling a robot device is provided. The method includes: obtaining remote sensing information from a user device, wherein the remote sensing information comprises at least one of 6-degrees-of-freedom (6DOF) trajectory information or presence information; obtaining an environment map from the robot device; reorienting the remote sensing information based on a determined offset and rotation for the remote sensing information; applying the offset and rotation to the remote sensing information to identify portions of the environment map that include detected objects; determining candidate areas for movement of the robot device based on the portions of the environment map that include the detected objects; and outputting the candidate areas for movement of the robot device for transmission to the robot device.

In another example, a non-transitory computer-readable medium having stored thereon instructions is provided. The instructions, when executed by at least one processor, cause the at least one processor to: obtain remote sensing information from a user device, wherein the remote sensing information comprises at least one of 6-degrees-of-freedom (6DOF) trajectory information or presence information; obtain an environment map from the robot device; reorient the remote sensing information based on a determined offset and rotation for the remote sensing information; apply the offset and rotation to the remote sensing information to identify portions of the environment map that include detected objects; determine candidate areas for movement of the robot device based on the portions of the environment map that include the detected objects; and output the candidate areas for movement of the robot device for transmission to the robot device.

As another example, an apparatus for controlling a robot device is provided. The apparatus includes: means for obtaining remote sensing information from a user device, wherein the remote sensing information comprises at least one of 6-degrees-of-freedom (6DOF) trajectory information or presence information; means for obtaining an environment map from the robot device; means for reorienting the remote sensing information based on a determined offset and rotation for the remote sensing information; means for applying the offset and rotation to the remote sensing information to identify portions of the environment map that include detected objects; means for determining candidate areas for movement of the robot device based on the portions of the environment map that include the detected objects; and means for outputting the candidate areas for movement of the robot device for transmission to the robot device.

In another example, an apparatus for controlling a robot device is provided. The apparatus includes at least one memory comprising instructions; and at least one processor coupled to the at least one memory. The at least one processor is configured to: receive a set of candidate areas from a controller, wherein the set of candidate areas were selected based on at least one of 6-degrees-of-freedom (6DOF) trajectory information or presence information; receive a schedule for cleaning, wherein the schedule for cleaning is determined based on presence information; select a cleaning tool or cleaning supplies of the robot device based on the schedule for cleaning and the set of candidate areas; and clean a portion of the set of candidate areas using the selected cleaning tool or cleaning supplies.

As another example, a method for controlling a robot device is provided. The method includes: receiving a set of candidate areas from a controller, wherein the set of candidate areas were selected based on at least one of 6-degrees-of-freedom (6DOF) trajectory information or presence information; receiving a schedule for cleaning, wherein the schedule for cleaning is determined based on presence information; selecting a cleaning tool or cleaning supplies of the robot device based on the schedule for cleaning and the set of candidate areas; and cleaning a portion of the set of candidate areas using the selected cleaning tool or cleaning supplies.

In another example, a non-transitory computer-readable medium having stored thereon instructions is provided. The instructions, when executed by at least one processor, cause the at least one processor to: receive a set of candidate areas from a controller, wherein the set of candidate areas were selected based on at least one of 6-degrees-of-freedom (6DOF) trajectory information or presence information; receive a schedule for cleaning, wherein the schedule for cleaning is determined based on presence information; select a cleaning tool or cleaning supplies of the robot device based on the schedule for cleaning and the set of candidate areas; and clean a portion of the set of candidate areas using the selected cleaning tool or cleaning supplies.

As another example, an apparatus for controlling a robot device is provided. The apparatus includes: means for receiving a set of candidate areas from a controller, wherein the set of candidate areas were selected based on at least one of 6-degrees-of-freedom (6DOF) trajectory information or presence information; means for receiving a schedule for cleaning, wherein the schedule for cleaning is determined based on presence information; means for selecting a cleaning tool or cleaning supplies of the robot device based on the schedule for cleaning and the set of candidate areas; and means for cleaning a portion of the set of candidate areas using the selected cleaning tool or cleaning supplies.

In some aspects, the apparatus can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
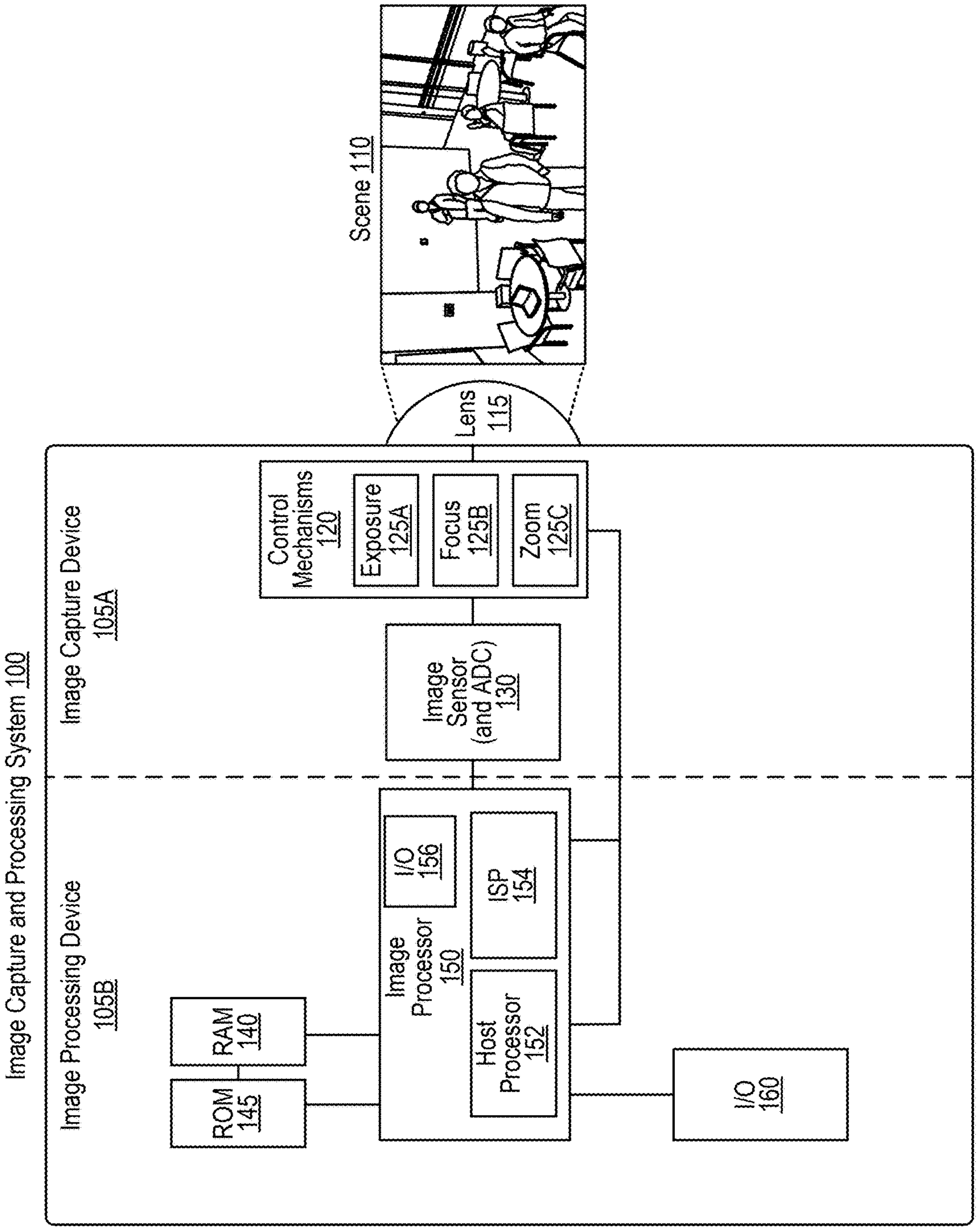
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

Systems and techniques are described for optimizing robot devices (or systems) using fused 6-degrees-of-freedom context. In some aspects, a resource manager may be used to optimize the robot devices. As noted previously, robot devices (or systems) may include various sensors to help them perform tasks around the home and/or office, such as cleaning, patrolling an area, inspection, and so forth. For example, a robot device, such as a robot vacuum, may include cameras which may be used to generate a map of an environment (e.g., via simultaneous localization and mapping (SLAM)), such as a home and/or office, that allows the robotic vacuum to navigate around the environment to provide users with control over where the robotic vacuum cleaner goes. However, such robotic systems may not be able to contextualize the maps built by such users and may ask users to label a map built by the robotic vacuum cleaner, manually set targeted cleaning areas, etc. Additionally, as such robot devices are typically limited to the sensors on the robot device and may not be able to sense activities in other locations, such as that people were eating in the living room and there may now be crumbs on the floor, or that a tree limb has fallen on a part of the lawn, etc.

In some cases, it may be useful to leverage sensors that may be located on other devices to provide information to the robot devices so they can better perform tasks. For example, user devices, such as smart phones, wearable devices, extended reality (XR) devices, etc. may include various sensors and may be able to provide contextual information about an environment in which the robotic system is operating. For example, a user device may include sensors, such as ultrasonic sensors, cameras, etc., which may be capable of detecting people, motion of people, or recognize activities of people in the environment. These devices may also be capable of generating a SLAM map by imaging the environment to located features of the environment to determine where the device is located. The user device may also generate 6-DOF information indicating how the user device has been moved through the environment using, for example SLAM information, accelerometer information, or information from other sensors of the user device. This information may be used to generate a presence heatmap, crowd density map, etc., indicating where people were located in the environment. This information may be output to a robotic controller.

The robotic controller may collect the information from the user device and align the information from the user device with a map of the robot device. For example, the robot device may generate a map of the environment, for example, using SLAM. The robotic controller may obtain the 6-DOF information from the user device and reorient (e.g., generate rotate/skew/offset correction information) the 6-DOF information to match the motion of the user device to the SLAM map of the robot device. The robotic controller may then apply the corrections to the presence heatmap to determine where people were located in the environment relative to the SLAM map. In some cases, matching may be performed based on landmarks, such as environmental features. In some cases, certain landmarks may be non-visible landmarks. For example, a landmark may be a determined location of a Wi-Fi router (e.g., determined via triangulation of detected transmissions from the Wi-Fi router). The robotic controller may receive a SLAM map from the user device and the robotic controller may reorient the SLAM map based on the correction information. In some cases, the robotic controller may receive information about recognized activities of people in the environment. For example, a user device may analyze an image of people in the environment and classify what activity the people in the environment appear to be doing. The robot device may receive these indicated activities along with the 6-DOF trajectory and presence heatmap from the user device, along with the SLAM map from the robot device to label areas of the SLAM map from the robot device based on the activities that were performed in these areas. For example, an area with the recognized activity as cooking may be labelled the kitchen, an area where the recognized activity of sitting on a couch may be labelled as the living room, and so forth.

In some cases, based on the area labels and presence heatmap, the robotic controller may determine areas of the SLAM map where the robot device should move (referred to as candidate areas for movement of the robot device). For example, if the robotic controller determines that there were many people in the living room, the robotic controller may schedule the living room for heavy cleaning by a vacuum robot. In some cases, indicated activities may also be used to determine the candidate areas for movement of the robot device (e.g., where the robot device should move). For example, if cooking is detected in the kitchen, then the robotic controller may schedule the kitchen for heavy cleaning. In some cases, indicated activities may not be person based. For example, if the indicated activity indicates that there is a large obstruction in a yard (e.g., a fence is down on the yard), the robotic controller for a robotic mower may indicate to the robotic mower to avoid that area of the yard.

The robot device may receive information from the robotic controller. For example, the robot device may receive the reoriented SLAM map from the user device. In some cases, the robot device may update the SLAM map of the robot device using the reoriented SLAM map from the user device. For example, the robot device may detect features of the environment from the SLAM map from the user device and update the SLAM map of the robot device with these features. The robot device may also monitor its performance to generate performance monitoring information. For example, a robotic vacuum may image a surface that it has cleaned to assign a cleaning score. As another example, a robot device may perform 6-DOF tracking to determine where the robot device has moved in the environment to generate a coverage score based on areas to move as indicated by the robotic controller. The performance monitoring information may be output back to the robotic controller and the robotic controller may summarize and/or format the performance monitoring information for display to the user.

A camera (e.g., image capture device) is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as International Standardization Organization (ISO), exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Degrees of freedom (DoF) refer to the number of basic ways a rigid object can move through three-dimensional (3D) space. In some cases, 6-degrees-of-freedom (6DoF) can be tracked. The 6DoF may include three translational degrees of freedom corresponding to translational movement along three perpendicular axes. The three axes can be referred to as x, y, and z axes. The six degrees of freedom include three rotational degrees of freedom corresponding to rotational movement around the three axes, which can be referred to as pitch, yaw, and roll.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

Visual simultaneous localization and mapping (VSLAM) is a computational geometry technique used in devices with cameras, such as robots, head-mounted displays (HMDs), mobile handsets, and autonomous vehicles. In VSLAM, a device can construct and update a map of an unknown environment based on images captured by the device's camera. The device can keep track of the device's pose within the environment (e.g., location and/or orientation) as the device updates the map. For example, the device can be activated in a particular room of a building and can move throughout the interior of the building, capturing images. The device can map the environment, and keep track of its location in the environment, based on tracking where different objects in the environment appear in different images.

In the context of systems that track movement through an environment, such as XR systems, SLAM systems, and/or VSLAM systems, degrees of freedom can refer to which of the six degrees of freedom the system is capable of tracking. 3-Degrees Of Freedom (3DoF) systems generally track the three rotational DoF—pitch, yaw, and roll. A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, and can track the user moving forward, backward, laterally, and/or vertically in addition to tracking the three rotational DoF.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 11:
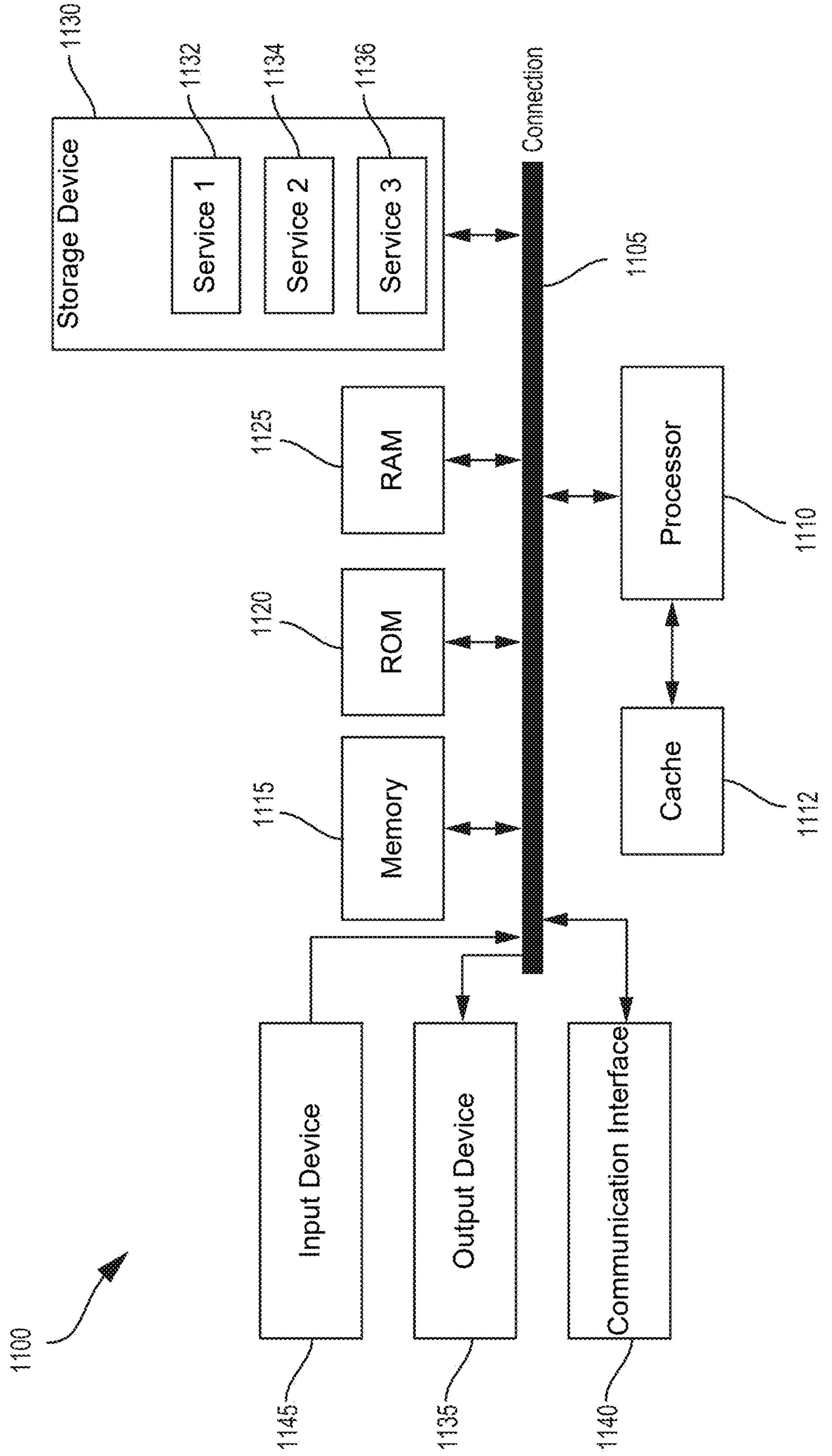
FIG. 11 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1110 discussed with respect to the computing system 1100 of FIG. 11. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
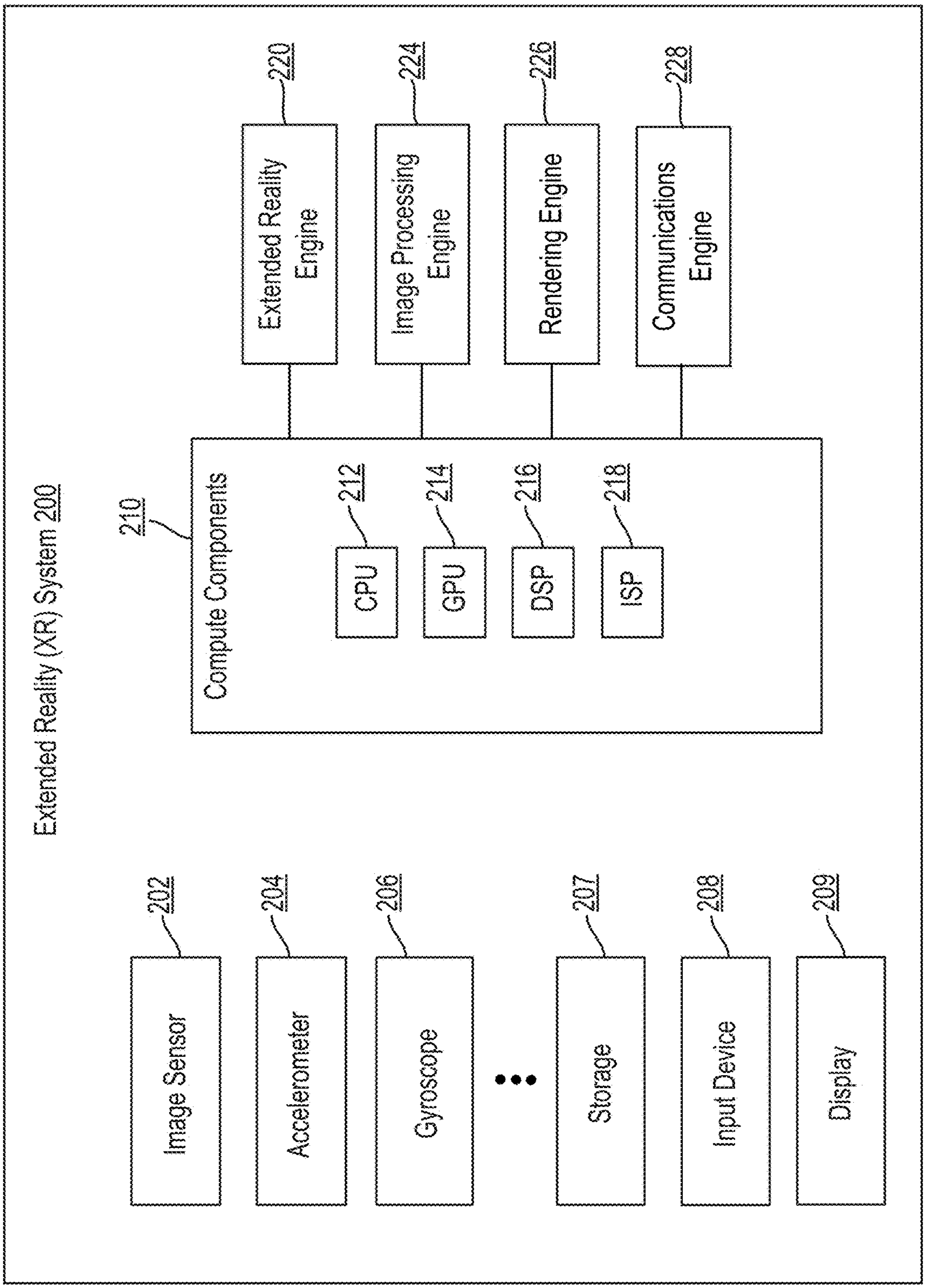
FIG. 2 is a diagram illustrating an architecture of an example extended reality (XR) system, in accordance with some aspects of the disclosure.

In some examples, the extended reality (XR) system 200 of FIG. 2 can include the image capture and processing system 100, the image capture device 105A, the image processing device 105B, or a combination thereof. In some examples, the simultaneous localization and mapping (SLAM) system 300 of FIG. 3 can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 940 of FIG. 9.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202 but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown), such as the SLAM system 300 of FIG. 3. SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map and can be three-dimensional (3D). The SLAM techniques can be performed using color or grayscale image data captured by the image sensor 202 (and/or other camera of the XR system 200) and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 210 can extract feature points corresponding to a mobile device, or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
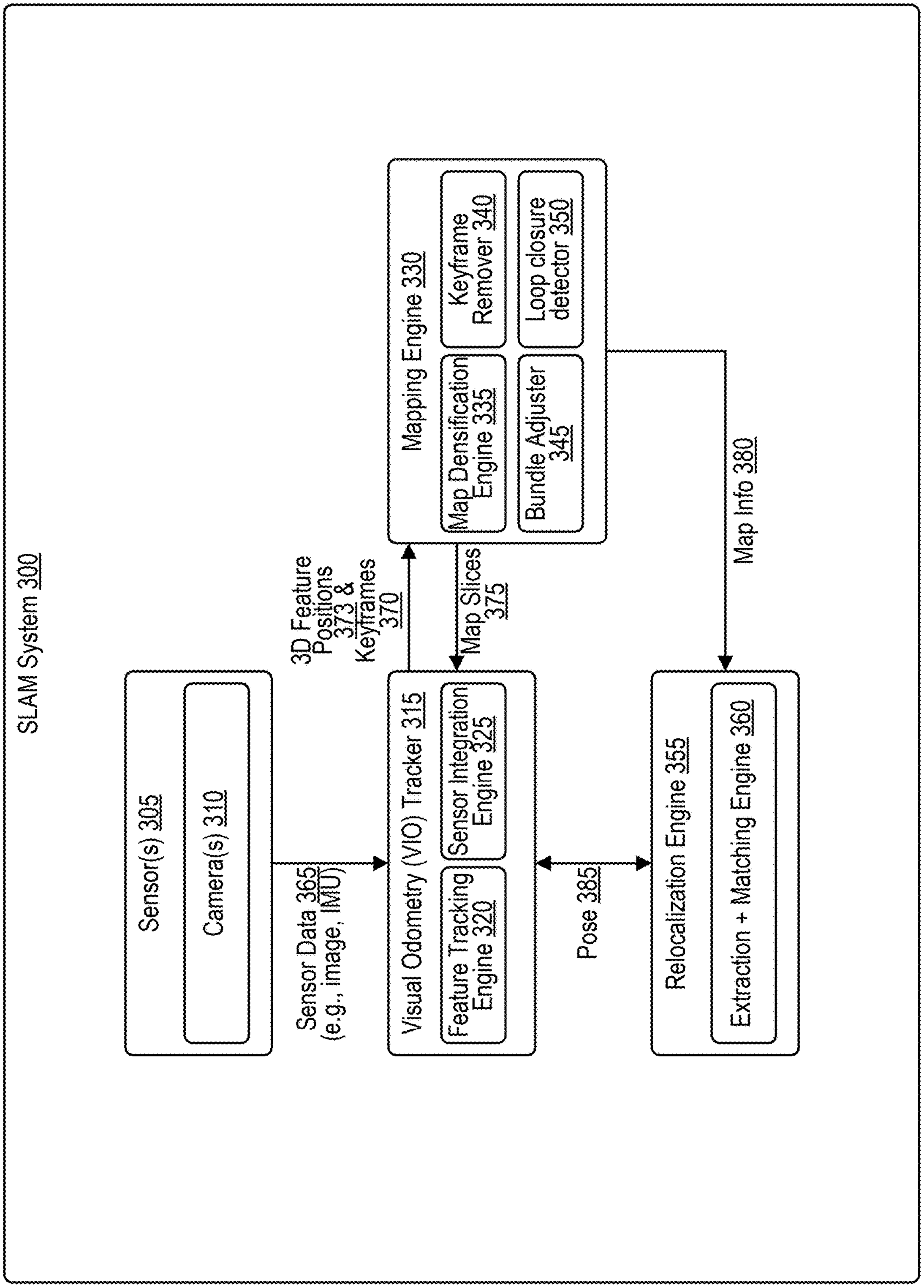
FIG. 3 is a block diagram illustrating an architecture of a simultaneous localization and mapping (SLAM) system, in accordance with aspects of the present disclosure.

FIG. 3 is a block diagram illustrating an architecture of a simultaneous localization and mapping (SLAM) system 300. In some examples, the SLAM system 300 can be, or can include, an extended reality (XR) system, such as the XR system 200 of FIG. 2. In some examples, the SLAM system 300 can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

The SLAM system 300 of FIG. 3 includes, or is coupled to, each of one or more sensors 305. The one or more sensors 305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the XR system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images (or frames) captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. The VIO tracker 315, in some cases with the mapping engine 330 and/or the relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image and capture to acquisition or capture of the second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine 3D feature positions 373 of a particular feature. The 3D feature positions 373 can include one or more 3D feature positions and can also be referred to as 3D feature points. The 3D feature positions 373 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 315 can also determine one or more keyframes 370 (referred to hereinafter as keyframes 370) corresponding to the particular feature. A keyframe (from one or more keyframes 370) corresponding to a particular feature may be an image in which the particular feature is clearly depicted. In some examples, a keyframe (from the one or more keyframes 370) corresponding to a particular feature may be an image in which the particular feature is clearly depicted. In some examples, a keyframe corresponding to a particular feature may be an image that reduces uncertainty in the 3D feature positions 373 of the particular feature when considered by the feature tracking engine 320 and/or the sensor integration engine 325 for determination of the 3D feature positions 373. In some examples, a keyframe corresponding to a particular feature also includes data associated with the pose 385 of the SLAM system 300 and/or the camera(s) 310 during capture of the keyframe. In some examples, the VIO tracker 315 can send 3D feature positions 373 and/or keyframes 370 corresponding to one or more features to the mapping engine 330. In some examples, the VIO tracker 315 can receive map slices 375 from the mapping engine 330. The VIO tracker 315 can feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330 generates a 3D map of the environment based on the 3D feature positions 373 and/or the keyframes 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340 can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region and can use such information to update a map slice and/or reduce the uncertainty in certain 3D feature points or other points in the map geometry. The mapping engine 330 can output map slices 375 to the VIO tracker 315. The map slices 375 can represent 3D portions or subsets of the map. The map slices 375 can include map slices 375 that represent new, previously unmapped areas of the map. The map slices 375 can include map slices 375 that represent updates (or modifications or revisions) to previously mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 373. The map information 380 can include one or more keyframes 370 corresponding to certain features and certain 3D feature positions 373.

The SLAM system 300 also includes a relocalization engine 355. The relocalization engine 355 can perform relocalization, for instance when the VIO tracker 315 fails to recognize more than a threshold number of features in an image (or frame), and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can extract features from an image captured by the cameras 310 of the SLAM system 300 while the SLAM system 300 is at a current pose 385 and can match the extracted features to features depicted in different keyframes 370, identified by 3D feature positions 373, and/or identified in the map information 380. By matching these extracted features to the previously identified features, the relocalization engine 355 can identify that the pose 385 of the SLAM system 300 is a pose 385 at which the previously identified features are visible to the cameras 310 of the SLAM system 300 and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

In some examples, the VIO tracker 315 can modify the image in the sensor data 365 before performing feature detection, extraction, and/or tracking on the modified image. For example, the VIO tracker 315 can rescale and/or resample the image. In some examples, rescaling and/or resampling the image can include downscaling, downsampling, subscaling, and/or subsampling the image one or more times. In some examples, the VIO tracker 315 modifying the image can include converting the image from color to greyscale, or from color to black and white, for instance by desaturating color in the image, stripping out certain color channel(s), decreasing color depth in the image, replacing colors in the image, or a combination thereof. In some examples, the VIO tracker 315 modifying the image can include the VIO tracker 315 masking certain regions of the image. Dynamic objects can include objects that can have a changed appearance between one image and another. For example, dynamic objects can be objects that move within the environment, such as people, vehicles, or animals. A dynamic object can be an object that have a changing appearance at different times, such as a display screen that may display different things at different times. A dynamic object can be an object that has a changing appearance based on the pose of the camera(s) 310, such as a reflective surface, a prism, or a specular surface that reflects, refracts, and/or scatters light in different ways depending on the position of the camera(s) 310 relative to the dynamic object. The VIO tracker 315 can detect the dynamic objects using facial detection, facial recognition, facial tracking, object detection, object recognition, object tracking, or a combination thereof. The VIO tracker 315 can detect the dynamic objects using one or more artificial intelligence algorithms, one or more trained machine learning models, one or more trained neural networks, or a combination thereof. The VIO tracker 315 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

In some cases, a robot device, such as robot cleaner may include a SLAM system, such as SLAM system 300 of FIG. 3, to navigate around an environment to perform a task, such as to clean a set of rooms. For example, the robot cleaner may be able to observe an environment, such as a set of rooms, using sensors to generate a map of features in the set of rooms. The robot cleaner may then navigate around the set of rooms using an IMU and/or by using sensors to detect various features of the environment and comparing the detected features to the features of the generated map. In some cases, this generated map may be labelled (e.g., via input received through a user interface) indicating, for example, a particular room is a living room, kitchen, etc. However, these labels alone may not provide much information about how much cleaning a particular room may use. For example, in some homes, the kitchen may be heavily used, while in others, the kitchen may be hardly used at all. In some cases, presence and/or activity information for a room may provide a better indication of how much cleaning a room may use. Presence information may indicate whether people were in a room, how often then were in the room, how long, etc. Activity information may indicate what people in a room were doing. The presence information and activity information may be included as a part of user context data, which may include information about a user of a user device, or as a part of environmental context data, which may include information about other people/animals/other living things in the environment around the user device. Of note, while described in the context of a robot cleaner, it should be understood that the techniques discussed herein are not limited to robot cleaners and may be applied to other robot devices.

In some cases, it may be difficult for a robot device that is mostly stationary (e.g., primarily docked/parked when people are active and operating primarily when people are not present, asleep, etc.), such as a robot cleaner, to generate presence information about the environment outside of a relatively limited area around the robot device. For example, depending on how a robot cleaner is positioned when it is not operating, sensors of the robot cleaner may be able to observe a room, or a part of a room, to generate presence information, but the robot cleaner may not be able to observe and generate presence information for another room of the set of rooms.

In some cases, it may be useful to leverage other devices (e.g., user devices) to help provide presence and/or activity information to help robot device to better perform tasks. These user devices may be dissimilar devices to the robot device that may be more capable of operating in the presence of people. For example, user devices, such as smart phones, wearable devices, XR devices, etc., may be leveraged to provide contextual information about an environment in which the robotic system is operating. In some cases, these user devices may include sensors which are not similar to the sensors of the robot device and/or may collect information in a way that is not similar to how the robot device may gather information. For example, an XR device may include radar, ultrasonic, lidar, specialized camera sensors, etc. that may not be present on a robot cleaner. Additionally, the XR device may move through the environment in three dimensions and usually above a ground level, as compared to a robot cleaner, which typically has a ground level view of the environment. Thus, information gathered by user devices may be processed for use by robot devices.

Figure 4:
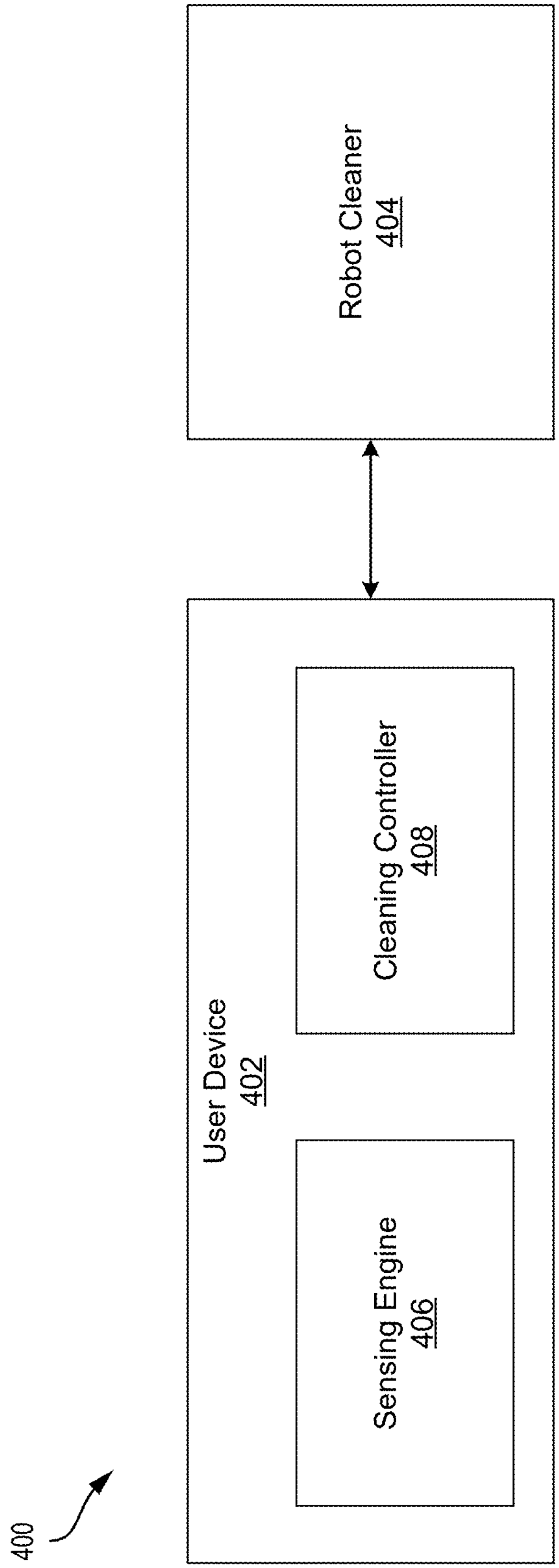
FIG. 4 is a block diagram illustrating a system for optimizing robot devices using fused 6-degrees-of-freedom context, in accordance with aspects of the present disclosure.

FIG. 4 is a block diagram illustrating a system for optimizing robot devices 400 using fused 6-degrees-of-freedom context, in accordance with aspects of the present disclosure. FIG. 4 includes a user device 402 communicatively coupled with a robot cleaner 404. In some cases, the user device 402 may communicate with the robot cleaner 404 via a communications network, such as a personal area network (PAN), wide area network (WAN), wireless local area network (WLAN), etc. In some cases, the user device may include a sensing engine 406. The sensing engine 406 may detect and/or process presence information, activity information, motion information, trajectory information, etc. In some cases, the user device 402 may include a cleaning controller 408. The cleaning controller 408 may process and/or provide information to the robot cleaner 404. In some cases, the cleaning controller 408 may be separate from the user device 402. For example, the cleaning controller 408 may be separate from the user device 402 and the robot cleaner 404, such as being integrated with a dock for the robot cleaner 404 or on a separate user device 402. In other cases, the cleaning controller may be integrated with the robot cleaner 404. In cases where the cleaning controller 408 is separate from the user device 402 and/or robot cleaner 404, the cleaning controller 408 may communicate with the user device 402 and the robot cleaner 404 via a communications network. In cases where the cleaning controller 408 is separate from the user device 402 and/or robot cleaner 404, the cleaning controller 408 may communicate with the user device 402 via one communications network (e.g., Wi-Fi) and cleaning controller 408 may communicate with the robot cleaner 404 via another communications network (e.g., Bluetooth).

Figure 5:
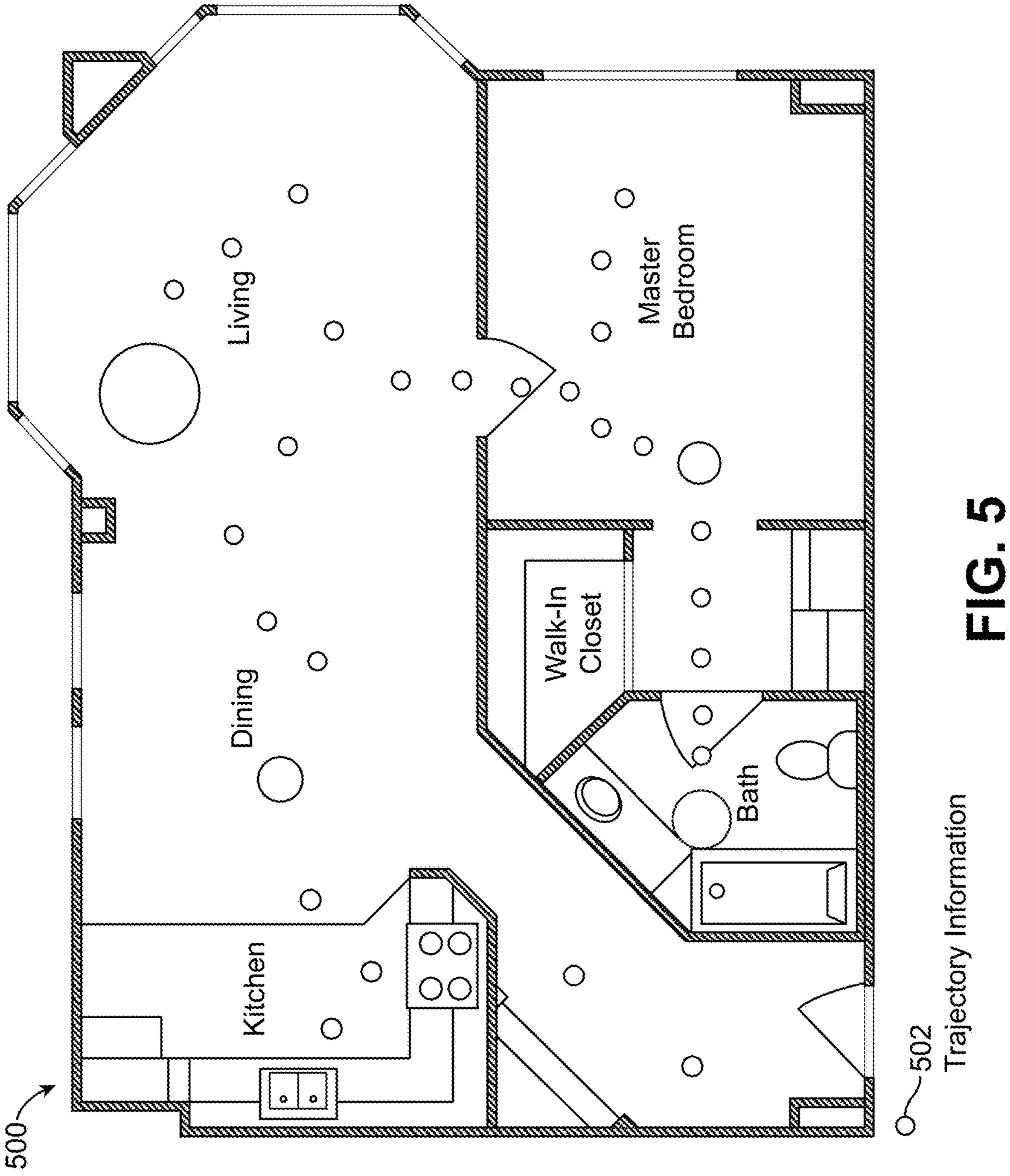
FIG. 5 illustrates information that may be collected for optimizing robot devices using fused 6-degrees-of-freedom context, in accordance with aspects of the present disclosure

In some cases, tasks to be performed by the robot device may be determined based on information provided by user devices dissimilar from the robot device. FIG. 5 illustrates information that may be collected 500 for optimizing robot devices using fused 6-degrees-of-freedom context, in accordance with aspects of the present disclosure. In some cases, user devices, such as user device 402 of FIG. 4, may be able to use a user's 6DoF/SLAM information to generate trajectory information 502 indicating how the user device was moved through an environment. The trajectory information 502 may indicate where the user device was located in the environment over time and larger spots may represent locations where the user device was located for longer periods of time. As an example, an XR device may include an IMU, camera sensors, GNSS sensors, WLAN positioning sensors, etc., that may be used to determine a pose (e.g., location and/or orientation) of the XR device in the environment. The trajectory information may include the location information and time information (e.g., indicating when and/or how long the user device was at a location).

In addition, the user device may include sensors that may provide additional information about the environment and this additional information may also be provided by the user device to help optimize how robot devices may perform certain tasks. For example, the user device may analyze IMU information, audio information, captured images, etc. to determine information about what activities a user of the user device and/or a person in a captured images may be engaged in. For example, an XR device may include one or more machine learning (ML) models capable of identifying certain activities, such as cooking, exercising, watching television, etc. that people in the environment may be engaged in. The activities of persons in the environment may be used to determine how the robot device performs certain tasks. For example, a robot cleaner may perform extra cleaning if cooking is detected. In some cases, image information or information from other sensors, such as ultrasonic sensors, radar sensors, lidar sensors, etc. may be used to detect other persons and/or animals (e.g., pets) in the environment. The presence of people in the environment may be used to determine how the robot device performs certain tasks. For example, a robot cleaner may perform extra cleaning if more people are detected in a certain room and less cleaning if no people are detected in another room.

Figure 6:
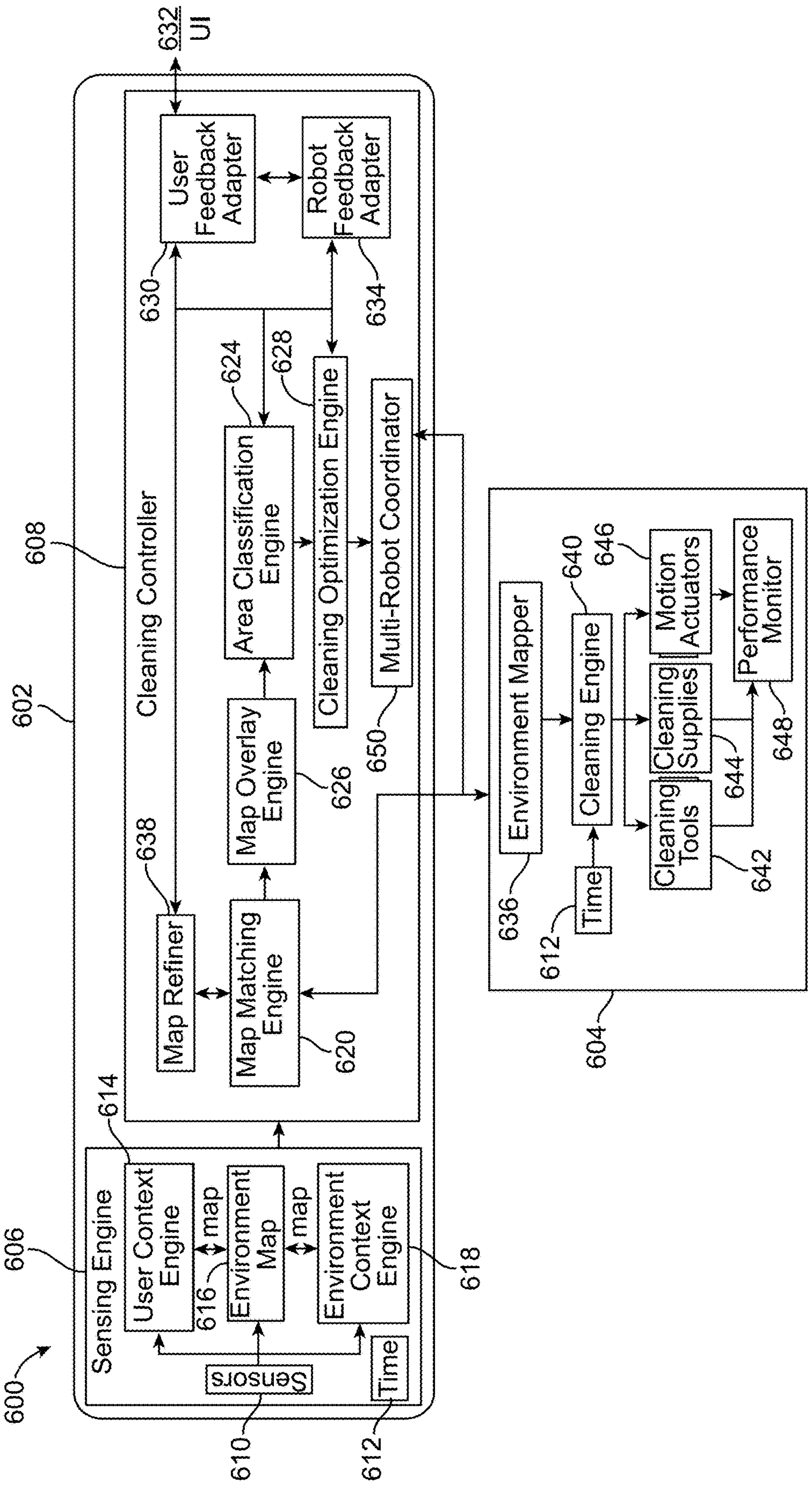
FIG. 6 is a block diagram illustrating an architecture of a technique for optimizing robot devices using fused 6-degrees-of-freedom context, in accordance with aspects of the present disclosure.

FIG. 6 is a block diagram illustrating an architecture 600 of a technique for optimizing robot devices using fused 6-degrees-of-freedom context, in accordance with aspects of the present disclosure. Architecture 600 includes a user device 602 and a robot cleaner 604. In architecture 600, the user device 602 includes a sensing engine 606 and a cleaning controller 608. The sensing engine 606 may detect and/or process presence information, activity information, motion information, trajectory information, etc. The sensing engine 606 may include a set of sensors 610 for sensing an environment around the user device 602. The sensors 610 may include a variety of sensors, such as accelerometers, camera(s), GNSS sensors, WLAN positioning sensors, ultrasonic, lidar, radar, etc. In some cases, the sensors 610 may generate time stamped information based on, for example, a system or network time 612. Information from the sensors 610 may be input to any of a user context engine 614, an environment map 616, or an environment context engine 618.

In some cases, the user context engine 614 may use information from the sensors 610 to determine contextual information about the user (e.g., user context data) of the user device 602 when the user device 602 is in use. The user context engine 614 may generate user context data that may be input to the cleaning controller 608. The environment map 616 may use information from the sensors 610 to build a map of the environment. This map of the environment may be based on a SLAM map, or other mapping technique, such as image registration, ranging, structure from motion, etc. In some cases, the map of the environment may include visual features, wireless (e.g., Wi-Fi, Bluetooth, etc.) signal strengths, depth maps, point clouds, etc. The map of the environment may be input to the cleaning controller 608. The environment context engine 618 may use information from the sensors 610 to determine context information from the environment around the user device 602. The environment context engine 618 may generate environmental context data that may be input to the cleaning controller 608.

In some cases, the environment context engine 618 may determine information about another person, animal (e.g., pets), or other living thing in the environment around the user device 602. The environmental context engine 618 may receive information from sensor(s) 610 such as camera images, lidar/radar point clouds, ultrasonic distance/shape information, etc. In some cases, the environmental context engine 618 may process the received information using one or more ML models to detect persons and/or animals and generate presence information. For example, object detection and/or segmentation ML models may be used to detect a variety of objects including persons and/or animals, such as YOLO, Detectron, single shot multibox detector (SSD), and the like. The presence information may indicate whether a person/animal/other living thing has been detected, along with location information for the person/animal/other living thing. In some cases, the location information may be relative to an environmental map of the user device 602 and the location information may indicate where, relative to the environmental map of the user device 602, a person/animal/other living thing has been detected. In some cases, the presence information may be included in environmental context data output by the environmental context engine 618.

In some cases, presence information may be in the form of a heatmap. For example, the environmental context engine 618 may obtain the environment map 616 and generate a heatmap indicating where the person/animal/other living thing has been detected and how often the person/animal/other living thing was at a particular location. In some cases, the environmental context engine 618 may generate a heatmap time sequence (e.g., a set of heatmaps organized by time/time bins) indicating the presence of people in a location. In some cases, the heatmaps may group nearby locations into a single location (e.g., binning). For the heatmaps, a higher heat may represent a long presence or more people in a location. The heatmaps may be included as a part of the environmental context data. The environmental context data may also be input to the environment map 616 and/or the user context engine 614.

In some cases, the environmental context data may also include information about the activities of other persons/animals/other living things. For example, the environmental context engine 618 may process received sensor information, such as audio information, images, etc., to generate activity information. The activity information may indicate what activities are being performed along with location information indicating where the activity is being performed in the environment. In some cases, the environmental context engine 618 may use one or more ML models or other activity recognition algorithms to detect activities of the other persons/animals/other living things. For example, the environmental context engine 618 may use ML models trained to detect certain activities (e.g., certain human motions associated with running on a treadmill, etc.), or objects related to certain activities (e.g., pots/pans to detect cooking, etc.) to determine what activities the other persons/animals/other living things are participating in. Examples of ML models for detecting activities may include human activity recognition (HAR), ideoMAE, OmniVec, and the like, and examples of datasets for training may include HMDB-51, UCF-101, AVA, and the like.

The user context engine 614 may receive motion information about a user of the user device 602, such as from an IMU sensor, to generate user context data about a motion of the user, such as a step count, gait information, gestures, etc. For example, the user context engine 614 may generate a 6DoF and/or SLAM trajectory (e.g., trajectory information) tracking the motion of the user through the environment for the user context data. In some cases, the 6DoF and/or SLAM trajectory may be based on a coordinate system of the environment map of the user device 602 and describe motion of the user device 602 relative to the environment map of the user device 602. The user context engine 614 may output the user context data to the environment map 616 as well as the cleaning controller 608.

In some cases, the user context data may also include information about the activities of the user. For example, the user context engine 614 may generate activity information by determining what activity a user of the user device 602 may be performing. The activity information may indicate what activities are being performed along with location information indicating where the activity is being performed in the environment. For example, the user context engine 614 may receive sensor information such as IMU information, audio information, images, etc. and process the sensor information to generate activity information about the user. In some cases, the user context engine 614 may use one or more ML models or other activity recognition algorithms (e.g., IMU pattern detection) to detect the activities of the user. For example, the user context engine 614 may use ML models trained to detect certain activities, or objects related to certain activities (e.g., post/pans/dishes/knives to detect cooking) to determine what activities the user is participating in. The user context engine 614 may output the activity as a part of the user context data.

The user context engine 614 may determine trajectory information based on movements of the user device 602. For example, the user context engine 614 may receive sensor 610 information, such as from an IMU, camera sensor, GNSS information, WLAN positioning sensors, etc., to determine a 6DoF pose and/or SLAM location. In some cases, the user context engine 614 may receive/obtain location information from the SLAM location and/or pose information along with the time 612 to generate the trajectory information. The trajectory information may be included as a part of the user context data.

The cleaning controller 608 may include a map matching engine 620, a map overlay engine 622, area classification engine 624, a cleaning optimization engine 628, multi-robot coordinator 650, user feedback adapter 630, user interface 632, robot feedback adapter 634, and a map refiner 638. The cleaning controller 608 may receive the user context data, environmental context data, and environment map from the sensing engine 606. As indicated above, the user context data and environmental context data may include trajectory information, presence heatmap, activity information, and/or motion information for the user of the user device as well as other people/animals/living things in the environment. The map matching engine 620 may receive the presence information, trajectory information, and an environment map (e.g., SLAM map) from the sensing engine 606. In some cases, the map matching engine 620 may also receive a robot environment map generated by an environment mapper 636 of the robot cleaner 604. In some cases, the robot environment map generated by the robot cleaner 604 may include landmarks, which may be a set of features (both visible and not visible) that may be associated with objects in an environment such as doors, room corners, a location of a Wi-Fi router, location of the robot cleaner charger (e.g., dock), etc.

The map matching engine 620 may reorient environment map 616 to determine an offset and rotation to match the robot environment map generated by the robot cleaner 604 based on the features/landmarks using any map matching algorithm. For example, the map matching engine 620 may compare features of the environment map 616 to features of the robot environment map to identify corresponding features. The map matching engine 620 may then reorient (e.g., apply an offset and rotation) remote sensing information to align the matched features. For example, the environment map 616 may be generated based on a coordinate system of the user device 602. The map matching engine 620 may determine a rotation/skew/offset correction for the environment map 616 to match a coordinate system used by the robot cleaner 604 using landmarks in the environment. For example, a first landmark present in the environment map 616 may be matched to a corresponding first landmark in the robot environment map. The presence heatmap and/or trajectory information may be adjusted (e.g., rotated/skewed/offset corrected) based on the determined rotation/skew/offset correction for the SLAM map to align a second landmark in the environment map 616 and corresponding second landmark in the robot environment map. In some cases, the map matching engine 620 may attempt to apply different rotations and offsets to the environment map 616 to match the robot environment map. In some cases, the environment map 616 and robot environment map may include features (e.g., features of the environment detected) that may be used to assist with the reorienting. For example, where the environment map 616 and robot environment map are visual maps generated based on captured images, a feature extractor may be run on each map (e.g., the environment map 616 and robot environment map) to detect visual features using a feature extracting (or ML based) algorithm such as SIFT, ORB etc. An image registration optimization algorithm (e.g., a feature-statistics based/machine learning based algorithm such as RANSAC, MLESAC etc.) may be applied to the extracted features of the maps to reduce re-projection error. The image registration algorithm may also rotate, shift, and/or scale images of one map to match images of the other map. In some cases, re-projection error may be estimated using metrics such as Normalized Cross Correlation (NCC) etc. The image registration algorithm may generate rotation, shift and scale information to match the environment map 616 and robot environment map. In some cases, landmarks such as wi-fi router, wireless charging station, phone charging stand in kitchen, known phone placements in house etc., may be used for quick map matching.

In some cases, a best match may be generated, and a user prompt may be generated via the user feedback adapter 630 and user interface 632 requesting user confirmation of the match or to provide landmarks and/or manual realignment). For example, in cases where there are no landmarks from the robot cleaner 604, a best match between the environment map and the remote sensing information may be made and the user feedback adapter 630 and user interface 632 may be used to query a user as to how well the best match fits. The user may also be queried as to a location of certain landmarks in the environment, such as a location of a Wi-Fi router, where the user device 602 is typically charged (e.g., location of a charging station), etc. The map matching engine 620 may then use the designated location of these landmarks to help with the matching. For example, if the remote sensing information includes an indication that the user device 602 is placed in a particular location for a long period of time in the evenings, that location may be matched with a charging station landmark. In some cases, the map matching engine 620 may output the matched environment map and remote sensing information to the map overlay engine 626.

As indicated above, the map matching engine 620 and/or the cleaning controller 608 may be separate from the user device 602. For example, the map matching engine 620 and/or the cleaning controller 608 may be integrated with the robot cleaner 604 or a dock of the robot cleaner 604. In cases where the map matching engine 620 and/or the cleaning controller 608 are integrated into the robot cleaner 604, the operations of the map matching engine 620 and/or the cleaning controller 608 may be performed when the robot cleaner 604 is connected to the dock and external power is available. In some cases, the map matching engine 620 and/or the cleaning controller 608 may be cloud based.

As indicated above, the map matching engine 620 may determine an offset and a rotation that may be used to align the environment map 616 and the robot environment map. This offset and rotation may be output to the map overlay engine 626. In some cases, the environment map 616 and robot environment map may also be output to the map overlay engine 626 along with the user context data and environmental context data. As indicated above, the user context data and environmental context data may include positional information (e.g., as a heatmap) and motion information. The map overlay engine 626 may reorient the positional information and motion information based on the determined offset and rotation to align the positional information and motion information with the robot environment map and environment map 616. The map overlay engine 626 may output the aligned positional information and motion information along with offset and rotation and/or aligned environment map 616/robot environment map to the area classification engine 624.

The area classifier engine 624 may determine labels for rooms/areas of the environment. The area classifier engine 624 may receive the matched environment map(s) and aligned trajectory information and motion information from the map matching engine 620 along with activity information from the user context data and environmental context data. The area classifier engine 624 may use activity information and motion information to assign labels to areas of the environment map. For example, the area classifier engine 624 may label an area an exercise area/room if the activity information and/or motion information indicate that the user was running (e.g., on a treadmill) in the area. Similarly, the area classifier engine 624 may label an area a kitchen if the activity information indicates that the activity detected in the area was cooking or if the trajectory information (e.g., from the remote sensing information matched with the environment map) indicates that the area was associated with an amount of back and forth walking and standing in the area. In some cases, the area classifier engine 624 may use a ML model to predict labels for areas. In some cases, the area classification engine 624 may output the labels, matched environment map(s), user context data, environment context data, motion information, and/or activity information to the cleaning optimization engine 628.

The cleaning optimization engine 628 may determine cleaning settings for the robot cleaner 604 along with candidate areas for cleaning and a schedule for cleaning (e.g., times when cleaning should be performed). The cleaning optimization engine 628 may receive the labels, matched environment map and remote sensing information, heatmap, motion information, and activity information from the area classification engine 624 and use this information to determine, for example, candidate areas which should be cleaned (e.g., based on the heatmap/environmental context data), a cleaning mode (e.g., degreasing if cooking is detected, cleaning with a certain cleaning tool and/or cleaning supply based on activity in/label for an area), cleaning intensity (e.g., more intense if cooking is detected), cleaning schedule (e.g., based on when people are present in the environment and/or movement context), candidate area to be cleaned, etc. In some cases, the cleaning optimization engine 628 may also receive robot feedback information from the robot feedback adapter 634 and adjust cleaning settings based on the robot feedback information. For example, the robot cleaner 604 may image an area that the robot cleaner 604 has cleaned and assign a cleaning score based on, for example, contaminates (e.g., dirt, dust, crumbs, spilled fluids, etc.) detected in the image. This cleaning score may be used to adjust the cleaning settings, for example, to perform a more intense cleaning of an area with a cleaning score indicating that the area was not cleaned as well as expected. The cleaning optimization engine 628 may transmit the cleaning settings along with areas of the environment associated with the cleaning settings and the cleaning schedule to the robot cleaner 604.

The robot feedback adapter 634 may receive robot feedback information from the robot cleaner 604 and provide the robot feedback information to the cleaning optimization engine 628. For example, the robot feedback adapter 634 may receive trajectory information for the robot cleaner 604 indicating the path the robot cleaner 604 has taken through the environment along with performance information, such as the cleaning score, evaluating how well the robot is performing, status updates regarding cleaning tool condition, cleaning supply levels, system status of the robot cleaner 604, etc. The robot feedback adapter 634 may share the trajectory information and/or performance information with the cleaning optimization engine 628 to help determine cleaning settings. The robot feedback adapter 634 may also share information received from the robot cleaner 604 with the user feedback adapter 630 for display on the user interface 632.

The user feedback adapter 630 may provide information for a user from the robot cleaner 604 and/or cleaning controller 608 as well as receive information from a user, such as feedback regarding how well the environment map and remote sensing information were matched, labels assigned to areas, cleaning settings used, etc. In some cases, the user feedback adapter 630 may perform reinforcement learning to try to reduce a number of user interventions and/or user instructions. For example, the user feedback adapter 630 may be a multi-layer perceptron with policy and value networks that attempt to minimize a disparity between human inputs and system estimates (e.g., for the matching, cleaning settings used, etc.). In reinforcement learning, a positive reward may be provided where there is less of a difference between the system estimate and human inputs and a negative reward may be provided where there is a larger difference between the system estimate and the human input.

In some cases, the environment map may be modified by the map refiner 638. The map refiner 638 may receive the matched environment maps and remote sensing information and the map refiner 638 may correct and/or add details from the remote sensing information to the environment map. For example, after the environment map 616 and the robot environment map have been matched, a user of the user device 602 may be prompted (e.g., via the user feedback adapter 630) to revise the maps. For example, the user may be able to identify areas that are not present in the environment map 616 and/or the robot environment map, the user may be asked to label areas (e.g., via a set of label options or using custom labels, identify obstacles that are not necessarily visible to the robot (e.g., stairs going down, glass objects, etc.). As another example, the user device 602 may be able to view landmarks in the environment from angles the robot cleaner 604 cannot and a user may be able to label/identify these landmarks. The map refiner 638 may add information provided by the user and/or user device may be used to refine the to the environment map 616 and/or robot environment map. In some cases, the refined map may be displayed to the user to confirm accuracy. The refined map may be used to help avoid collisions, accidents, and/or improve performance. In some cases, the environment mapper 636 may pass the environment map (or portions thereof) to the map matching engine 620.

In some cases, multiple robot cleaners 604 may be used in the environment. In such cases, the multi-robot coordinator 650 may coordinate the operations of the multiple robot cleaners. In some cases, the multi-robot coordinator 650 may divide up the environment into different cleaning zones associated with different robot cleaners 604. For example, each robot cleaner may operate in a separate cleaning zone. The multiple robot cleaners 604 may connect with user devices 602 across cleaning zones. The multiple robot cleaners 604 may also synchronize cleaning schedules. In some cases, the multiple robot cleaners 604 may share a single environment map 616 across the multiple robots and any of the robot cleaners 604 may refine the environment map 616.

In FIG. 6, the robot cleaner 604 includes an environment mapper 636, a cleaning engine 640, cleaning tools 642, cleaning supplies 644, motion actuators 646, and a performance monitor 648. In some cases, the environment mapper 636 may generate the environment map for the robot cleaner 604 and transmit the environment map, for example to the map matching engine 620. In some cases, the robot cleaner 604 may include a camera capable of capturing images of the environment and the robot cleaner 604 may generate the environment map based on SLAM. In some cases, the robot cleaner 604 may generate the environment map by detecting landmarks (e.g., detecting non-visible landmarks using radio frequency triangulation) and IMU based trajectory information.

In some cases, multiple user devices 602 may provide information (e.g., matched environment map and remote sensing information, cleaning settings, schedule, etc. In some cases, the multiple user devices 602 may each be associated with different identifiers and the information provided by each user device may be tagged with the different identifiers. In some cases, the cleaning engine 640 may receive different cleaning settings, schedules, etc., from the different user devices 602. In some cases, the cleaning engine 640 may learn to prioritize information from one user over another over time. In some cases, audio analysis or gait analysis may be used to estimate age or other demographics information that may be used to optimize cleaning. For example, a child may be expected to produce more food waste than an adult and the cleaning engine 640 (or cleaning optimization engine 628) may prioritize cleaning those areas associated with the child (e.g., trajectory information from a user device associated with the child). In some cases, the demographic information may also be useful for labelling areas. For example, an area where children are detected often, but where adults are less often detected may be labeled as a child's bedroom or playroom.

The cleaning engine 640 may receive the environment map from the environment mapper 636 along with cleaning settings from the cleaning optimization engine 628. The cleaning engine may then select cleaning tools 642 and/or cleaning supplies 644 based on the cleaning settings and command the motion actuators 646 to move the robot cleaner based on the cleaning schedule from the cleaning optimization engine 628.

The performance monitor 648 may provide status updates for the robot cleaner 604 and provide feedback indicating how well the robot cleaner 604 is cleaning. In some cases, the performance monitor 648 may receive status updates from systems of the robot cleaner 604. For example, the performance monitor 648 may receive information indicating, for example, battery status, whether maintenance is due, cleaning supply 644 levels, whether cleaning supplies 644 should be refilled, whether cleaning tool(s) 642 are malfunctioning, whether a motion actuator 646 is jammed, etc. The performance monitor 648 may also provide feedback indicating how well the robot cleaner 604 is cleaning, for example, by taking images of cleaned surfaces and using, for example, a ML model to determine, from the images, a cleaning score indicating how well the cleaned surface was cleaned (e.g., by detecting features consistent with contaminants). For example, a ML may be trained to score images of surfaces with varying levels and types of contaminants and types of floors.

In some cases, the performance monitor 648 may also track a path of the robot cleaner 604 through the environment to determine a coverage score for the area(s) the robot cleaner 604 was instructed to clean (e.g., by the schedule from the cleaning optimization engine 628). In some cases, the performance monitor 648 may determine the track of the robot cleaner 604 through the environment using an IMU-based 6DoF tracking system that can track a location of the robot cleaner 604 based on a set of landmarks in the environment map. For example, the robot cleaner 604 may initially discover and add landmarks to the environment map. In some cases, the landmarks may not be visible. For example, the landmarks may be detectable via radio frequency broadcasts, such as Wi-Fi routers, Bluetooth beacons, connected devices (e.g., smart TVs, smart light switches, etc.), a dock for the robot cleaner, etc. In some cases, the robot cleaner 604 may use these landmarks to correct pose drift in the IMU to track the location of the robot cleaner 604. In some cases, the landmarks may be communicated to the user device 602 and the user device 602 may perform SLAM/6DoF tracking relative to the landmarks. In some cases, if GNSS signals, the GNSS signals may be used to track the location of the user device 602 and/or robot cleaner 604.

In some cases, the robot cleaner 604 may be able to track an amount (or number) of contaminants (e.g., dirt, dust, etc.) is being cleaned up (e.g., picked up) and the robot cleaner 604 may compare the amount or number of contaminants cleaned up against the heatmap and/or activity information. For example, if more contaminants are cleaned up in areas where the heatmap indicated the user device 602 was located longer, then the robot cleaner may adjust, for example, how frequently cleanings may be scheduled, how closely to match the heatmap to clean, etc.

In some cases, the 6DoF pose and/or trajectory information may also be used to avoid collisions and/or falling off of areas, such as stairs, drop-offs, etc. For example, where the trajectory information indicates that the user device 602 has a significant vertical component in a particular area, that area may be marked as a stair and/or step in the environment map. Additionally, the trajectory information may be used to avoid the user device 602 and associated user (e.g., avoid collisions). Trajectory information may also be useful for collision avoidance, work route optimization, monitoring daily activity zones, locate a spot for staging (e.g., stand-by location) detecting anomalies in trajectory (e.g., falling), and the like.

In some cases, such as where the user device 602 is a wearable device, the 6DoF trajectory may be used to provide instructions to the robot cleaner 604. For example, the user context engine 614 may detect certain sets of trajectories that may be associated with certain movements (e.g., gestures) made by the user, such as reaching downwards toward an oncoming robot cleaner 604 for emergency stop, a petting motion where the robot cleaner 604 is close by for pausing cleaning, etc. In some cases, these gestures may be used to control the robot cleaner 604 where the pose/6DoF trajectory information indicates that the robot cleaner 604 is near the user device 602.

Figure 7:
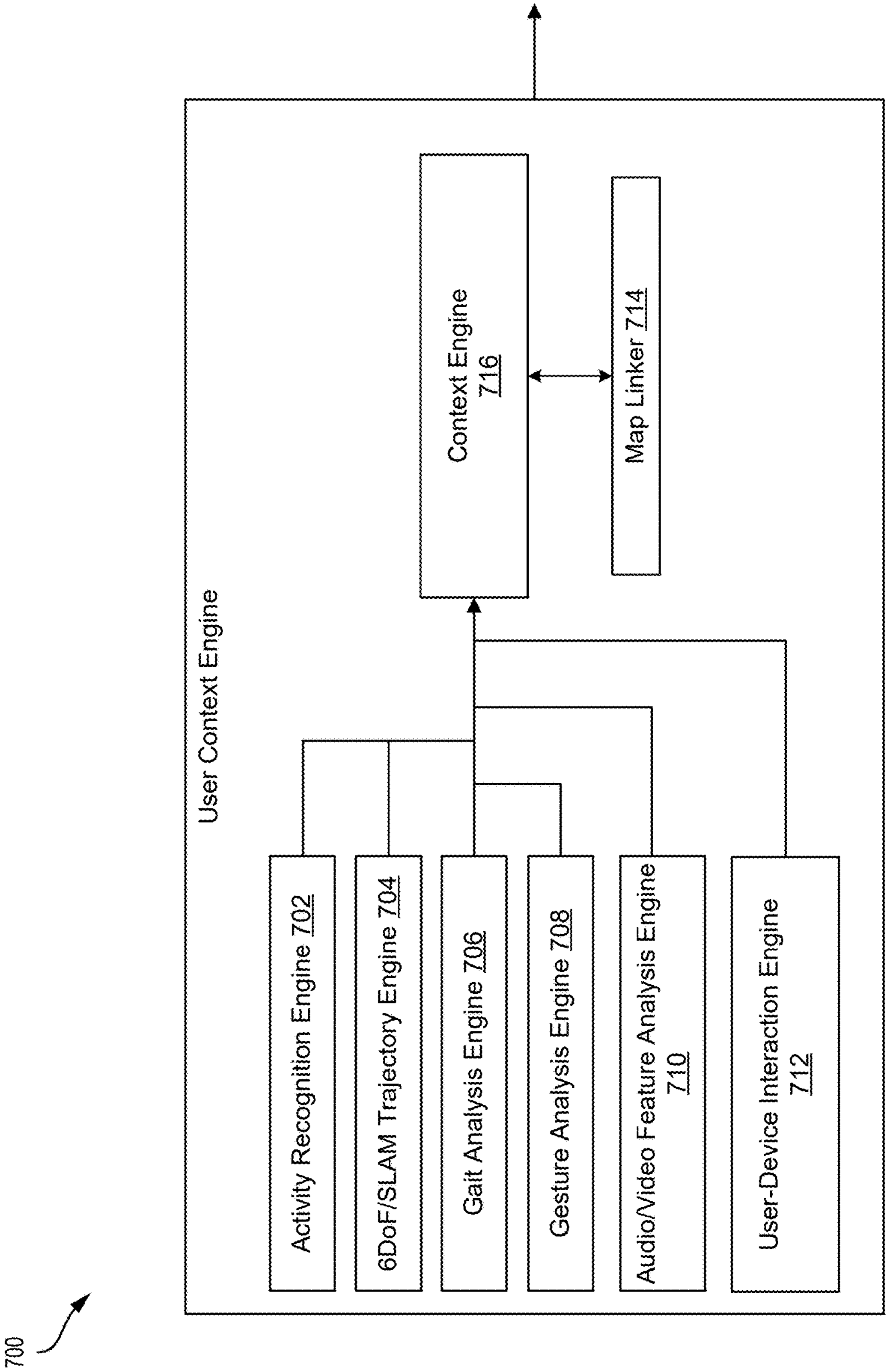
FIG. 7 illustrates a user context engine, in accordance with aspects of the present disclosure.

FIG. 7 illustrates a user context engine 700, in accordance with aspects of the present disclosure. In some cases, user context engine 700 may be substantially similar to user context engine 614 of FIG. 6. In FIG. 7, the user context engine 700 includes an activity recognition engine 702, a 6DoF/SLAM trajectory engine 704, a gait analysis engine 706, a gesture analysis engine 708, an audio/video feature analysis engine 710, user-device interaction engine 712, map linker 714, and a context engine 716.

As indicated above, the user context engine 700 may receive sensor information from multiple sensors, such as one or more cameras, ultrasound sensors, ambient light sensor, pressure sensor, IMU, motion sensors, etc., and the user context engine 700 may infer information about a user of the user device based on the sensor information. For example, the activity recognition engine 702 may receive IMU, motion data, etc. and the activity recognition engine 702 may predict an activity the user is performing. The activity recognition engine 702 may be ML based. The activity recognition engine 702 may output this predicted activity to the context engine 716. The 6DoF/SLAM trajectory engine 704 may receive IMU information and/or images and the 6DoF/SLAM trajectory engine 704 may predict a trajectory of the user device (and hence the user) through the environment. In some cases, the 6DoF/SLAM trajectory engine 704 may be ML based. The 6DoF/SLAM trajectory engine 704 may output the trajectory information to the context engine 716. The gait analysis engine 706 may receive IMU information, motion data, images, etc. to predict a gait of the user (e.g., how the user is walking). In some cases, the gait analysis engine 706 maybe ML based. The gait analysis engine 706 may output this gait information to the context engine 716. The gesture analysis engine 708 may receive IMU information, motion data, images, etc. to predict a gesture that the user of the user device may be making. In some cases, the gesture analysis engine 708 may be ML based. The gesture analysis engine 708 may output this gesture information to the context engine 716. The audio/video feature analysis engine 710 may receive and analyze captured images and/or audio, for example to provide information for the activity recognition engine 702, 6DoF/SLAM trajectory engine 704, gesture analysis engine, etc. The user-device interaction engine 712 may receive user input through the user's interaction with the smart device. User input can be received in form of touch events on the device touchscreen, haptic feedback through user's shaking and/or squeezing of the device, vocal commands, specific user gestures sensed by IMU or camera and programmed and/or learned by the device to initiate specific cleaning tasks etc. For example, the user may instruct the robot cleaner 604 to clean a specific area with specific intensity, for specified duration, with specific cleaning tool, etc.

The map linker 714 may link user context received from the context engine 716 with the environment map. For example, the map linker 714 may link different locations on the environment map with associated user context such as presence information, activity information, etc., at that location by overlaying the user context with the environment map. In some cases, the context engine 716 processes and aggregates context information received from the activity recognition engine 702, 6DoF/SLAM trajectory engine 704, gait analysis engine 706, gesture analysis engine 708, audio/video feature analysis engine 710, user-device interaction engine 712, etc. The context engine 716 may provide user context in a pre-specified format (e.g., a common format). In some cases, the context engine 716 may be implemented using, for example, an if/else decision tree, ML predictor, etc. With the use of map linker 714, this user context is overlayed on (linked with) the environment map.

Figure 8:
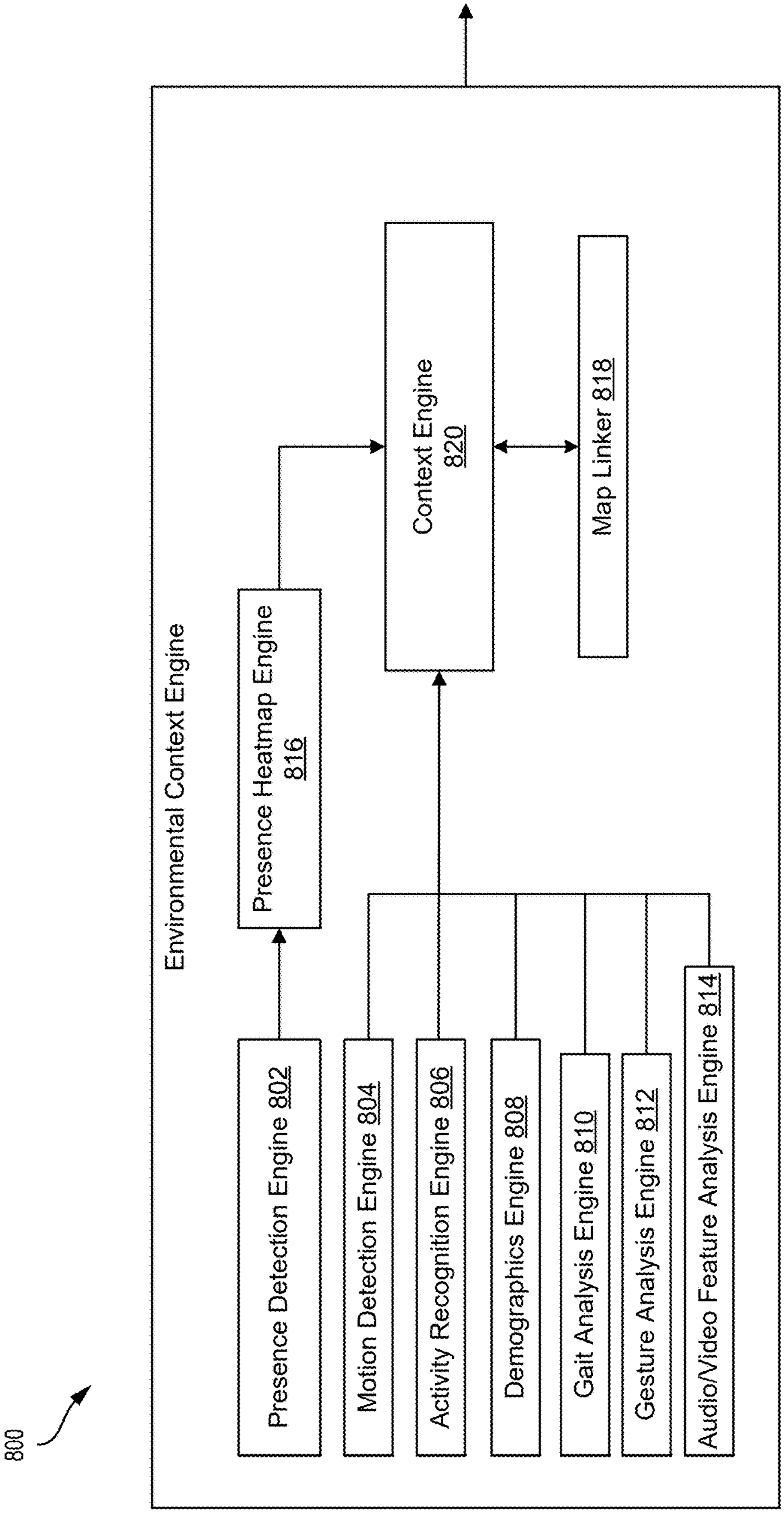
FIG. 8 illustrates an environmental context engine, in accordance with aspects of the present disclosure.

FIG. 8 illustrates an environmental context engine 800, in accordance with aspects of the present disclosure. In some cases, environmental context engine 800 may be substantially similar to environmental context engine 618 of FIG. 6. In FIG. 8, the environmental context engine 800 includes a presence detection engine 802, a motion detection engine 804, an activity recognition engine 806, a demographics engine 808, a gait analysis engine 810, a gesture analysis engine 812, an audio/video feature analysis engine 814, a presence heatmap engine 816, a map linker 818, and a context engine 820.

As indicated above, the environmental context engine 800 may receive sensor information from multiple sensors, such as one or more cameras, ultrasound sensors, ambient light sensor, pressure sensor, lidar information, radar information, etc., and the environmental context engine 800 may infer information about people, animals, other living things in the environment around the user device based on the sensor information. For example, the presence detection engine 802 may receive images, audio information, lidar information, radar information, etc. and determine whether there are other people/animals/other living things in the environment around the user device. In some cases, the presence detection engine 802 may use ML based techniques, and presence information generated by the presence detection engine may be output to the presence heatmap engine 816. The presence heatmap engine 816 may generate a heatmap based on the presence information indicating, for example, whether another person/animal/other living thing has been detected and how often the other person/animal/other living thing was at a particular location. The presence heatmap engine 816 may output the heatmap to the context engine 820.

The motion detection engine 804 may use images, audio information, lidar information, radar information, etc., to detect motion of other people, animals, other living things in the environment. The motion information may be output to the context engine 820. In some cases, the motion information may also be used by the activity recognition engine 806 along with images, audio information, lidar information, radar information, etc., to predict activities of other people, animals, etc. are performing. The activity recognition engine 806 may be ML based and the activity recognition engine 806 may output this predicted activity to the context engine 820. The demographics engine 808 may receive presence information, motion information, images, audio information, lidar information, radar information, etc., and the demographics engine 808 may predict demographics information for other people, animals, etc. that may be detected. The demographics engine 808 may output the demographics information to the context engine 820. The gait analysis engine 810 may receive motion information, images, audio information, lidar information, radar information, etc., to predict and/or recognize a gait of the other people, animals, etc. For example, the gait analysis engine 810 may be able to identify a person based on their gait. In some cases, the gait analysis engine 810 maybe ML based. The gait analysis engine 810 may output this gait information to the context engine 820. The gesture analysis engine 812 may receive motion information, images, audio information, lidar information, radar information, etc., to predict gestures being made by other people, animals, etc. In some cases, the gesture analysis engine 812 may be ML based. The gesture analysis engine 812 may output this gesture information to the context engine 820. The audio/video feature analysis engine 814 may receive and analyze captured images and/or audio, for example to provide information for presence detection engine 802, motion detection engine 804, activity recognition engine 806, demographics engine 808, gait analysis engine 810, gesture analysis engine 812, etc. The map linker 818 may be similar to map linker 714 of FIG. 7 and the map linker 818 may link user context received from the context engine 820 with the environment map. In some cases, the context engine 820 may process and aggregate information received from the presence detection engine 802, motion detection engine 804, activity recognition engine 806, demographics engine 808, gait analysis engine 810, gesture analysis engine 812, etc. In some cases, the context engine 820 may provide a user context in a pre-specified format. In some cases, the context engine 820 may be implemented using, for example, an if/else decision tree, ML predictor, etc.

Figure 9:
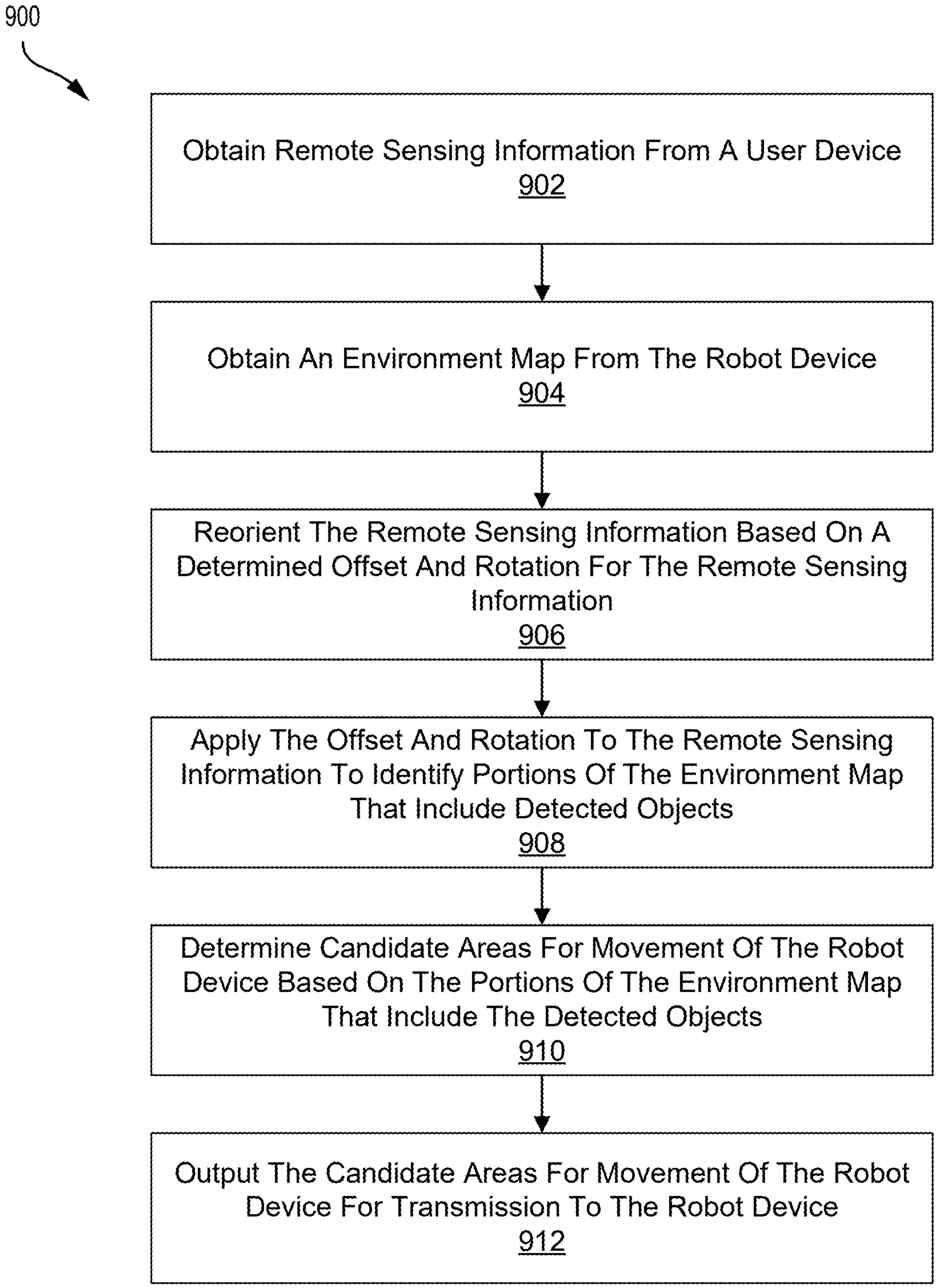
FIG. 9 is a flow diagram illustrating a process for managing a robot device, in accordance with aspects of the present disclosure.

FIG. 9 is a flow diagram illustrating a process 900 for managing a robot device, in accordance with aspects of the present disclosure. The process 900 may be performed by a computing device (or apparatus) or a component (e.g., a chipset, codec, etc., such as the host processor 150, image processor 150 of FIG. 1, compute components 210 of FIG. 2, SLAM system 300, processor 1110 of FIG. 11, etc.) of the computing device (e.g., image capture and processing system 100 of FIG. 1, XR system 200 of FIG. 2, user device 402 of FIG. 4, computing system 1100 of FIG. 11, etc.). The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 900 may be implemented as software components that are executed and run on one or more processors.

At block 902, the computing device (or component thereof) may obtain remote sensing information from a user device (e.g., based on information from sensors, such as the set of sensors 610 of FIG. 6). In some cases, the remote sensing information comprises at least one of 6-degrees-of-freedom (6DOF) trajectory information (e.g., trajectory information 502 of FIG. 5) or presence information. For example, the user context engine 614 of FIG. 6 may generate a 6DoF and/or SLAM trajectory (e.g., trajectory information) tracking the motion of the user through the environment. In some cases, the remote sensing information comprises activity information indicating an activity performed in an associated location. In some examples, the computing device (or component thereof) may determine a label for the environment map at least based on the activity information. For example, the area classifier engine 624 of FIG. 6 may use activity information and motion information to assign labels to areas of the environment map. In some cases, the computing device (or component thereof) may determine a cleaning setting of the robot device based on the label; and output the cleaning setting of the robot device for transmission to the robot device. In some examples, the remote sensing information includes presence information. In some cases, the computing device (or component thereof) may output a user prompt to confirm the offset and rotation to the presence information. In some examples, the remote sensing information includes presence information, wherein the presence information include one of a heatmap or crowd density map.

At block 904, the computing device (or component thereof) may obtain an environment map from the robot device (e.g., robot cleaner 604 of FIG. 6). For example, a robot environment map generated by an environment mapper 636 of FIG. 6 of a robot cleaner 604 of FIG. 6 may be received. In some cases, the environment map includes one or more landmarks, and wherein the at least one processor is configured to determine the offset and rotation based on the one or more landmarks. In some examples, the one or more landmarks include at least one non-visible landmark. In some cases, the environment map comprises simultaneous localization and mapping (SLAM) map information of the robot device. In some examples, the computing device (or component thereof) may determine the offset and rotation by matching the SLAM map information of the robot device to an environment map of the apparatus based on the one or more landmarks; and apply the offset and rotation to the remote sensing information.

At block 906, the computing device (or component thereof) may reorient the remote sensing information based on a determined offset and rotation for the remote sensing information. For example, the map matching engine 620 of FIG. 6 may compare features of the environment map 616 of FIG. 6 to features of the robot environment map to identify corresponding features and reorient (e.g., apply an offset, rotation, skew) to align the matched features and a presence heatmap may be adjusted (e.g., rotates/skewed/offset corrected) based on the determined rotation/skew/offset correction.

At block 908, the computing device (or component thereof) may apply the offset and rotation to the remote sensing information to identify portions of the environment map that include detected objects. For example, a presence heatmap may be adjusted (e.g., rotates/skewed/offset corrected) based on the determined rotation/skew/offset correction. In some cases, the detected objects comprise at least one of people or animals.

At block 910, the computing device (or component thereof) may determine (e.g., by the cleaning optimization engine 628 of FIG. 6) candidate areas for movement of the robot device based on the portions of the environment map that include the detected objects. In some cases, the candidate areas for movement of the robot device are further determined based on at least one of the label for the environment map or the activity information.

At block 912, the computing device (or component thereof) may output the candidate areas for movement of the robot device for transmission to the robot device. In some cases, the computing device (or component thereof) may receive cleaning scores indicating detected contaminants on a surface for portions of the candidate areas; and update the candidate areas based on the cleaning scores.

Figure 10:
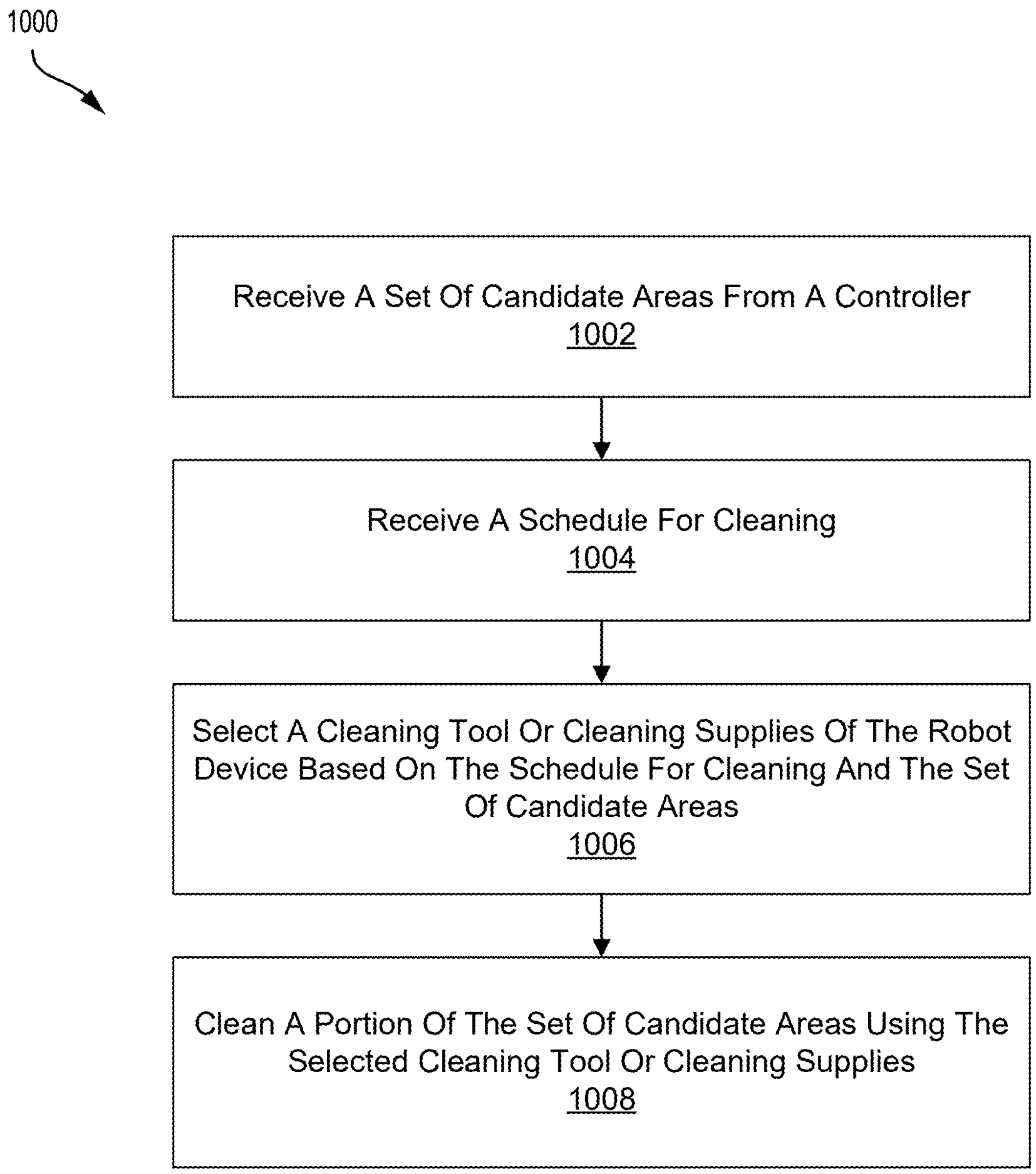
FIG. 10 is a flow diagram illustrating a process for operating a robot device, in accordance with aspects of the present disclosure.

FIG. 10 is a flow diagram illustrating a process 1000 for controlling a robot device, in accordance with aspects of the present disclosure. The process 1000 may be performed by a computing device (or apparatus) or a component (e.g., a chipset, codec, etc., such as the host processor 150, image processor 150 of FIG. 1, SLAM system 300, processor 1110 of FIG. 11, etc.) of the computing device (e.g., the robot cleaner 404 of FIG. 4, robot cleaner 604 of FIG. 6, computing system 1100 of FIG. 11, etc.). The computing device may be a robotic device (e.g., cleaning robot, warehouse robot, mowing robot, etc.), or other type of computing device. The operations of the process 1000 may be implemented as software components that are executed and run on one or more processors.

At block 1002, the computing device (or component thereof) may receive a set of candidate areas from a controller (e.g., sensing engine 406 of FIG. 4, cleaning controller of FIG. 4, sensing engine 606 of FIG. 6, cleaning controller 608 of FIG. 6, etc.). In some cases, the set of candidate areas were selected based on at least one of 6-degrees-of-freedom (6DOF) trajectory information (e.g., trajectory information 502 of FIG. 5) or presence information. In some examples, the set of candidate areas includes a heatmap or crowd density map. In some cases, the computing device (or components thereof) may detect one or more landmarks of an environment around the robot device; generate an environment map based on the detected one or more landmarks; and transmit the environment map to the controller. In some examples, the computing device (or components thereof) may receive remote sensing information from the controller, wherein the remote sensing information comprises a simultaneous localization and mapping (SLAM) map rotated and offset based on one or more landmarks of an environment map of the robot device; detect one or more features of an environment from the SLAM map; and update the environment map based on the detected one or more features of the environment from the SLAM map. For example, the user context engine 614 of FIG. 6 may generate a 6DoF and/or SLAM trajectory (e.g., trajectory information) tracking the motion of the user through the environment and the map matching engine 620 of FIG. 6 may compare features of the environment map 616 of FIG. 6 to features of the robot environment map to identify corresponding features and reorient (e.g., apply an offset and rotation) remote sensing information to align the matched features. In some cases, the set of candidate areas have been rotated and offset based on one or more landmarks of an environment map of the robot device. In some examples, the computing device (or component thereof) may receive an updated set of candidate areas from the controller, wherein the set of candidate areas are updated based on the coverage score for the portion of the set of candidate areas. In some cases, the remote sensing information includes presence information, wherein the presence information include one of a heatmap or crowd density map.

At block 1004, the computing device (or component thereof) may receive a schedule for cleaning. In some cases, the schedule for cleaning is determined based on presence information. In some examples, the computing device (or component thereof) may track an amount of contaminants being picked up and adjust the schedule for cleaning based on the set of candidate areas and the tracked amount of contaminants being picked up in the candidate areas of the set of candidate areas.

At block 1006, the computing device (or component thereof) may select a cleaning tool or cleaning supplies of the robot device based on the schedule for cleaning and the set of candidate areas. In some cases, the computing device (or component thereof) may receive cleaning settings from the controller, and select the cleaning tool or the cleaning supplies of the robot device based on the cleaning settings.

At block 1008, the computing device (or component thereof) may clean a portion of the set of candidate areas using the selected cleaning tool or cleaning supplies. In some cases, the computing device (or component thereof) may track a path of the robot device based on an environment map and information from an inertial measurement unit (IMU); determine a coverage score, the coverage score indicating a confidence that the path of the robot device covered a portion of the set of candidate areas; and transmit the coverage score for the portion of the set of candidate areas to the controller. In some examples, the computing device (or components thereof) may obtain images of an environment, the images including a surface in the environment; determine a cleaning score by detecting contaminants on the surface in the images; and transmit the cleaning score for the portion of the set of candidate areas to the controller. In some cases, the computing device (or component thereof) may determine an amount of time spent cleaning the set of candidate areas; determine a size of the set of candidate areas; determine an overall cleaning task score based on the amount of time spent cleaning the set of candidate areas and the size of the set of candidate areas; and output the overall cleaning task score.

In some examples, the techniques or processes described herein may be performed by a computing device, an apparatus, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

In some cases, the devices or apparatuses configured to perform the operations of the process 900, process 1000, and/or other processes described herein may include a processor, microprocessor, micro-computer, or other component of a device that is configured to carry out the steps of the process 900, process 1000, and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 900, process 1000, and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 900 and process 1000 are illustrated as a logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 900, process 1000, and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some examples, computing system 1100 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, camera, accelerometers, gyroscopes, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some examples, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection). Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM)

such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1. An apparatus for controlling a robot device, the apparatus comprising: at least one memory; and at least one processor coupled to the at least one memory, the at least one processor being configured to: obtain remote sensing information from a user device, wherein the remote sensing information comprises at least one of 6-degrees-of-freedom (6DOF) trajectory information or presence information; obtain an environment map from the robot device; reorient the remote sensing information based on a determined offset and rotation for the remote sensing information; apply the offset and rotation to the remote sensing information to identify portions of the environment map that include detected objects; determine candidate areas for movement of the robot device based on the portions of the environment map that include the detected objects; and output the candidate areas for movement of the robot device for transmission to the robot device.

Aspect 2. The apparatus of Aspect 1, wherein the remote sensing information comprises activity information indicating an activity performed in an associated location, and wherein the at least one processor is configured to determine a label for the environment map at least based on the activity information.

Aspect 3. The apparatus of Aspect 2, wherein the at least one processor is configured to: determine a cleaning setting of the robot device based on the label; and output the cleaning setting of the robot device for transmission to the robot device.

Aspect 4. The apparatus of any of Aspects 2-3, wherein the candidate areas for movement of the robot device are determined based on at least one of the label for the environment map or the activity information.

Aspect 5. The apparatus of any of Aspects 1-4, wherein the environment map includes one or more landmarks, and wherein the at least one processor is configured to determine the offset and rotation based on the one or more landmarks.

Aspect 6. The apparatus of Aspect 5, wherein the one or more landmarks include at least one non-visible landmark.

Aspect 7. The apparatus of any of Aspects 5-6, wherein the environment map further comprises simultaneous localization and mapping (SLAM) map information of the robot device, and wherein the at least one processor is configured to: determine the offset and rotation by matching the SLAM map information of the robot device to an environment map of the apparatus based on the one or more landmarks; and apply the offset and rotation to the remote sensing information.

Aspect 8. The apparatus of any of Aspects 1-7, wherein the detected objects comprise at least one of people or animals.

Aspect 9. The apparatus of any of Aspects 1-8, wherein the remote sensing information includes presence information, and wherein the at least one processor is configured to output a user prompt to confirm the offset and rotation to the presence information.

Aspect 10. The apparatus of any of Aspects 1-9, wherein the remote sensing information includes presence information, wherein the presence information includes one of a heatmap or crowd density map.

Aspect 11. The apparatus of any of Aspects 1-10, wherein the at least one processor is configured to: receive cleaning scores indicating detected contaminants on a surface for portions of the candidate areas; and update the candidate areas based on the cleaning scores.

Aspect 12. An apparatus for controlling a robot device, comprising: at least one memory; and at least one processor coupled to the at least one memory, the at least one processor being configured to: receive a set of candidate areas from a controller, wherein the set of candidate areas were selected based on at least one of 6-degrees-of-freedom (6DOF) trajectory information or presence information; receive a schedule for cleaning, wherein the schedule for cleaning is determined based on presence information; select a cleaning tool or cleaning supplies of the robot device based on the schedule for cleaning and the set of candidate areas; and clean a portion of the set of candidate areas using the selected cleaning tool or cleaning supplies.

Aspect 13. The apparatus of Aspect 12, wherein the at least one processor is configured to: detect one or more landmarks of an environment around the robot device; generate an environment map based on the detected one or more landmarks; and transmit the environment map to the controller.

Aspect 14. The apparatus of any of Aspects 12-13, further comprising: receive remote sensing information from the controller, wherein the remote sensing information comprises a simultaneous localization and mapping (SLAM) map rotated and offset based on one or more landmarks of an environment map of the robot device; detect one or more features of an environment from the SLAM map; and update the environment map based on the detected one or more features of the environment from the SLAM map.

Aspect 15. The apparatus of any of Aspects 12-14, further comprising: receive cleaning settings from the controller, and select the cleaning tool or the cleaning supplies of the robot device based on the cleaning settings.

Aspect 16. The apparatus of any of Aspects 12-15, wherein the set of candidate areas includes a heatmap or crowd density map.

Aspect 17. The apparatus of any of Aspects 12-16, wherein the at least one processor is configured to: track a path of the robot device based on an environment map and information from an inertial measurement unit (IMU); determine a coverage score, the coverage score indicating a confidence that the path of the robot device covered a portion of the set of candidate areas; and transmit the coverage score for the portion of the set of candidate areas to the controller.

Aspect 18. The apparatus of Aspect 17, wherein the at least one processor is configured to receive an updated set of candidate areas from the controller, wherein the set of candidate areas are updated based on the coverage score for the portion of the set of candidate areas.

Aspect 19. The apparatus of any of Aspects 12-18, wherein the at least one processor is configured to: obtain images of an environment, the images including a surface in the environment; determine a cleaning score by detecting contaminants on the surface in the images; and transmit the cleaning score for the portion of the set of candidate areas to the controller.

Aspect 20. The apparatus of Aspect 19, wherein the at least one processor is configured to receive an updated set of candidate areas from the controller, wherein the set of candidate areas are updated based on the cleaning score for the portion of the set of candidate areas.

Aspect 21. The apparatus of any of Aspects 12-20, wherein the at least one processor is configured to: track an amount of contaminants being picked up; and adjust the schedule for cleaning based on the set of candidate areas and the tracked amount of contaminants being picked up in the candidate areas of the set of candidate areas.

Aspect 22. The apparatus of any of Aspects 12-21, wherein the at least one processor is configured to: determine an amount of time spent cleaning the set of candidate areas; determine a size of the set of candidate areas; determine an overall cleaning task score based on the amount of time spent cleaning the set of candidate areas and the size of the set of candidate areas; and output the overall cleaning task score.

Aspect 23. The apparatus of any of Aspects 12-22, wherein the set of candidate areas have been rotated and offset based on one or more landmarks of an environment map of the robot device.

Aspect 24. A method for controlling a robot device, the method comprising: obtaining remote sensing information from a user device, wherein the remote sensing information comprises at least one of 6-degrees-of-freedom (6DOF) trajectory information or presence information; obtaining an environment map from the robot device; reorienting the remote sensing information based on a determined offset and rotation for the remote sensing information; applying the offset and rotation to the remote sensing information to identify portions of the environment map that include detected objects; determining candidate areas for movement of the robot device based on the portions of the environment map that include the detected objects; and outputting the candidate areas for movement of the robot device for transmission to the robot device.

Aspect 25. The method of Aspect 24, wherein the remote sensing information comprises activity information indicating an activity performed in an associated location, and further comprising determining a label for the environment map at least based on the activity information.

Aspect 26. The method of Aspect 25, further comprising: determining a cleaning setting of the robot device based on the label; and outputting the cleaning setting of the robot device for transmission to the robot device.

Aspect 27. The method of any of Aspects 25-26, wherein the candidate areas for movement of the robot device are determined based on at least one of the label for the environment map or the activity information.

Aspect 28. The method of any of Aspects 24-27, wherein the environment map includes one or more landmarks, and further comprising determining the offset and rotation based on the one or more landmarks.

Aspect 29. The method of Aspect 28, wherein the one or more landmarks include at least one non-visible landmark.

Aspect 30. The method of any of Aspects 28-29, wherein the environment map further comprises simultaneous localization and mapping (SLAM) map information of the robot device, and further comprising: determining the offset and rotation by matching the SLAM map information of the robot device to an environment map of a controller based on the one or more landmarks; and applying the offset and rotation to the remote sensing information.

Aspect 31. The method of any of Aspects 24-30, wherein the detected objects comprise at least one of people or animals.

Aspect 32. The method of any of Aspects 24-31, wherein the remote sensing information includes presence information, and further comprising outputting a user prompt to confirm the offset and rotation to the presence information.

Aspect 33. The method of any of Aspects 24-32, wherein the remote sensing information includes presence information, wherein the presence information includes one of a heatmap or crowd density map.

Aspect 34. The method of any of Aspects 24-33, further comprising: receiving cleaning scores indicating detected contaminants on a surface for portions of the candidate areas; and updating the candidate areas based on the cleaning scores.

Aspect 35. A method for controlling a robot device, comprising: receiving a set of candidate areas from a controller, wherein the set of candidate areas were selected based on at least one of 6-degrees-of-freedom (6DOF) trajectory information or presence information; receiving a schedule for cleaning, wherein the schedule for cleaning is determined based on presence information; selecting a cleaning tool or cleaning supplies of the robot device based on the schedule for cleaning and the set of candidate areas; and cleaning a portion of the set of candidate areas using the selected cleaning tool or cleaning supplies.

Aspect 36. The method of Aspect 35, further comprising: detecting one or more landmarks of an environment around the robot device; generating an environment map based on the detected one or more landmarks; and transmitting the environment map to the controller.

Aspect 37. The method of any of Aspects 35-36, further comprising: receiving remote sensing information from the controller, wherein the remote sensing information comprises a simultaneous localization and mapping (SLAM) map rotated and offset based on one or more landmarks of an environment map of the robot device; detecting one or more features of an environment from the SLAM map; and updating the environment map based on the detected one or more features of the environment from the SLAM map.

Aspect 38. The method of any of Aspects 35-37, further comprising: receive cleaning settings from the controller, and select the cleaning tool or the cleaning supplies of the robot device based on the cleaning settings.

Aspect 39. The method of any of Aspects 35-38, wherein the set of candidate areas includes a heatmap or crowd density map.

Aspect 40. The method of any of Aspects 35-39, further comprising: tracking a path of the robot device based on an environment map and information from an inertial measurement unit (IMU); determining a coverage score, the coverage score indicating a confidence that the path of the robot device covered a portion of the set of candidate areas; and transmitting the coverage score for the portion of the set of candidate areas to the controller.

Aspect 41. The method of Aspect 40, further comprising receiving an updated set of candidate areas from the controller, wherein the set of candidate areas are updated based on the coverage score for the portion of the set of candidate areas.

Aspect 42. The method of any of Aspects 35-41, further comprising: obtaining images of an environment, the images including a surface in the environment; determining a cleaning score by detecting contaminants on the surface in the images; and transmit the cleaning score for the portion of the set of candidate areas to the controller.

Aspect 43. The method of Aspect 42, further comprising receiving an updated set of candidate areas from the controller, wherein the set of candidate areas are updated based on the cleaning score for the portion of the set of candidate areas.

Aspect 44. The method of any of Aspects 35-43, further comprising: tracking an amount of contaminants being picked up; and adjusting the schedule for cleaning based on the set of candidate areas and the tracked amount of contaminants being picked up in the candidate areas of the set of candidate areas.

Aspect 45. The method of any of Aspects 35-44, further comprising: determining an amount of time spent cleaning the set of candidate areas; determining a size of the set of candidate areas; determining an overall cleaning task score based on the amount of time spent cleaning the set of candidate areas and the size of the set of candidate areas; and outputting the overall cleaning task score.

Aspect 46. The method of any of Aspects 35-45, wherein the set of candidate areas have been rotated and offset based on one or more landmarks of an environment map of the robot device.

Aspect 47. A non-transitory computer-readable medium having stored thereon instructions that, when executed by at least one processor, cause the at least one processor to perform one or more of operations according to any of Aspects 24 to 34.

Aspect 48. A non-transitory computer-readable medium having stored thereon instructions that, when executed by at least one processor, cause the at least one processor to perform one or more of operations according to any of Aspects 35 to 46.

Aspect 49: An apparatus for image generation, comprising means for performing one or more of operations according to any of Aspects 24 to 34.

Aspect 50: An apparatus for image generation, comprising means for performing one or more of operations according to any of Aspects 35 to 46.

What is claimed is:

1. An apparatus for controlling a robot device, the apparatus comprising:
- at least one memory; and
- at least one processor coupled to the at least one memory, the at least one processor being configured to:
  - obtain remote sensing information from a user device, wherein the remote sensing information comprises at least one of 6-degrees-of-freedom (6DOF) trajectory information, presence information, or activity information;
  - obtain an environment map from the robot device;
  - reorient the remote sensing information based on a determined offset and rotation for the remote sensing information;
  - apply the offset and rotation to the remote sensing information to identify portions of the environment map that include detected objects;
  - determine candidate areas for movement of the robot device based on the portions of the environment map that include the detected objects; and
  - output the candidate areas for movement of the robot device for transmission to the robot device, wherein the output candidate areas cause the robot device to move to at least one of the output candidate areas.

2. The apparatus of claim 1, wherein the remote sensing information comprises activity information indicating an activity performed in an associated location, and wherein the at least one processor is configured to determine a label for the environment map at least based on the activity information.

3. The apparatus of claim 2, wherein the at least one processor is configured to:
- determine a cleaning setting of the robot device based on the label; and
- output the cleaning setting of the robot device for transmission to the robot device.

4. The apparatus of claim 2, wherein the candidate areas for movement of the robot device are determined based on at least one of the label for the environment map or the activity information.

5. The apparatus of claim 1, wherein the environment map includes one or more landmarks, and wherein the at least one processor is configured to determine the offset and rotation based on the one or more landmarks.

6. The apparatus of claim 5, wherein the one or more landmarks include at least one non-visible landmark.

7. The apparatus of claim 5, wherein the environment map comprises simultaneous localization and mapping (SLAM) map information of the robot device, and wherein the at least one processor is configured to:
- determine the offset and rotation by matching the SLAM map information of the robot device to an environment map of the apparatus based on the one or more landmarks; and
- apply the offset and rotation to the remote sensing information.

8. The apparatus of claim 1, wherein the detected objects comprise at least one of people or animals.

9. The apparatus of claim 1, wherein the remote sensing information includes presence information, and wherein the at least one processor is configured to output a user prompt to confirm the offset and rotation to the presence information.

10. The apparatus of claim 1, wherein the remote sensing information includes presence information, wherein the presence information includes one of a heatmap or crowd density map.

11. The apparatus of claim 1, wherein the at least one processor is configured to:
- receive cleaning scores indicating detected contaminants on a surface for portions of the candidate areas; and
- update the candidate areas based on the cleaning scores.

12. A method for controlling a robot device, the method comprising:

obtaining remote sensing information from a user device, wherein the remote sensing information comprises at least one of 6-degrees-of-freedom (6DOF) trajectory information, presence information, or activity information;

obtaining an environment map from the robot device;

reorienting the remote sensing information based on a determined offset and rotation for the remote sensing information;

applying the offset and rotation to the remote sensing information to identify portions of the environment map that include detected objects;

determining candidate areas for movement of the robot device based on the portions of the environment map that include the detected objects; and outputting the candidate areas for movement of the robot device for transmission to the robot device, wherein the output candidate areas cause the robot device to move to at least one of the output candidate areas.

13. The method of claim 12, wherein the remote sensing information comprises activity information indicating an activity performed in an associated location, and further comprising determining a label for the environment map at least based on the activity information.

14. The method of claim 13, further comprising:

determining a cleaning setting of the robot device based on the label; and outputting the cleaning setting of the robot device for transmission to the robot device.

15. The method of claim 13, wherein the candidate areas for movement of the robot device are determined based on at least one of the label for the environment map or the activity information.

16. The method of claim 12, wherein the environment map includes one or more landmarks, and further comprising determining the offset and rotation based on the one or more landmarks.

17. The method of claim 16, wherein the one or more landmarks include at least one non-visible landmark.

18. The method of claim 16, wherein the environment map further comprises simultaneous localization and mapping (SLAM) map information of the robot device, and further comprising:

determining the offset and rotation by matching the SLAM map information of the robot device to an environment map of a controller based on the one or more landmarks; and applying the offset and rotation to the remote sensing information.

19. The method of claim 12, wherein the detected objects comprise at least one of people or animals.

20. The method of claim 12, wherein the remote sensing information includes presence information, and further comprising outputting a user prompt to confirm the offset and rotation to the presence information.

21. The method of claim 12, wherein the remote sensing information includes presence information, wherein the presence information includes one of a heatmap or crowd density map.

22. The method of claim 12, further comprising:

receiving cleaning scores indicating detected contaminants on a surface for portions of the candidate areas; and updating the candidate areas based on the cleaning scores.

* * * * *